United States Patent
Kawata et al.

(10) Patent No.: US 7,843,953 B2
(45) Date of Patent: Nov. 30, 2010

(54) NETWORK CONTROL DEVICE AND CONTROL METHOD

(75) Inventors: Yuichi Kawata, Kanagawa (JP); Nobuaki Suzuki, Kanagawa (JP); Makoto Kimura, Kanagawa (JP); Kenichi Takahashi, Kanagawa (JP); Seishiro Kato, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 334 days.

(21) Appl. No.: 11/641,682

(22) Filed: Dec. 20, 2006

(65) Prior Publication Data

US 2007/0211725 A1  Sep. 13, 2007

(30) Foreign Application Priority Data

Mar. 8, 2006 (JP) .............................. 2006-063003

(51) Int. Cl.
*H04L 12/28* (2006.01)
*G06F 1/26* (2006.01)
*G06F 1/32* (2006.01)

(52) U.S. Cl. ....................................... 370/419; 713/320
(58) Field of Classification Search ........................ None
See application file for complete search history.

(56) References Cited

U.S. PATENT DOCUMENTS 5,400,331 A * 3/1995 Lucak et al. ................. 370/401
5,742,833 A * 4/1998 Dea et al. .................... 713/323
6,085,328 A * 7/2000 Klein et al. .................. 713/310

FOREIGN PATENT DOCUMENTS

| JP | A 2003-191570 | 7/2003 |
| JP | A-2003-298613 | 10/2003 |
| JP | A-2004-140618 | 5/2004 |
| JP | A-2004-180159 | 6/2004 |
| JP | A-2005-026955 | 1/2005 |

OTHER PUBLICATIONS

Japanese Office Action in Japanese Application No. 2006-063003, dated Jul. 27, 2010 (with translation).

* cited by examiner

*Primary Examiner*—Ayaz R Sheikh
*Assistant Examiner*—Sori A Aga
(74) *Attorney, Agent, or Firm*—Oliff & Berridge, PLC

(57) ABSTRACT

A network control device that has a packet filtering unit for implementing packet filtering based on prescribed information in a header of a received packet, which includes: a position designating unit that designates a prescribed comparison position in a higher level protocol header to the header of the received packet; and an additional determination unit that implements pattern matching filtering by comparing data at the comparison position designated by the position designating unit with preset data.

6 Claims, 17 Drawing Sheets

| 301 | 302 | 303 | 304 | 305 |
|---|---|---|---|---|
| COMMUNICATIONS STANDARD | LINK LAYER | NETWORK LAYER | TRANSPORT LAYER | COMPARISON CONTENTS |
| ETHERNET | ETHER II | IPV4/IPV6 | TCP | DESIGNATION OF PORT NUMBER — 310 |
| | | | UDP | DESIGNATION OF PORT NUMBER — 311 |
| | | | DESIGNATION OF IP PROTOCOL NUMBER (e.g., ICMP) — 312 | |
| | | DESIGNATION OF TYPE (e.g., ARP OR IPX) | | |
| | 802.3ROW | 8-BYTE PATTERN FOLLOWING TYPE; COMPARISON POSITION CAN BE SELECTED IN BYTES — 313 | | |
| | 802.2LLC | | | |
| | SNAP | | | |

EXAMPLE OF A CASE WHEN THE ASSOCIATED FILTER IS A PORT NUMBER

EXAMPLE OF A CASE WHEN THE ASSOCIATED FILTER IS AN IP HIGHER-LEVEL PROTOCOL NO.

EXAMPLE OF A CASE WHEN THE ASSOCIATED FILTER IS AN ETHERTYPE

EXAMPLE OF A CASE WHEN THE ASSOCIATED FILTER IS AN 802-COMPLIANT FRAME

32-BYTE PATTERN
(32 BYTES)

COMPARISON
BYTE FLAG
(4 BYTES)

COMPARISON
END FLAG
(4 BYTES)

| Pattern Category (601) | Setting Contents for Unnecessary Packet Filter (602) | Setting Contents for Wakeup Filter (603) | | Setting Contents for Additional Pattern Matching Filter (604) |
|---|---|---|---|---|
| | | TCP Port Number | UDP Port Number | |
| 0 | DISCARD DHCP PROTOCOL (67) OF UDP<br>UDP PORT NO. IS SET TO 67 | 515, 631, 80, 25, 9100, 80, 15000, 111, 1605, 427, 443 | 67, 161, 162, 137, 138, 111, 1605, 427 | COMPARE ONLY THE FIRST BYTE "0" OF UDP PORT NUMBER 67 IN ASSOCIATION WITH UNNECESSARY PACKET FILTER OF PATTERN "0" |
| 1 | NO SETTING FOR IP HIGHER-LEVEL PROTOCOL NO. | IP HIGHER-LEVEL PROTOCOL NO. IS SET TO 1(ICMP) AND 58(ICMPV6) | | NO SETTING |
| 2 | NO SETTING FOR ETHER TYPE | ETHER TYPE NO. IS SET TO 0X0806 (ARP) | | COMPARE ALLOCATED IP ADDRESS IN ASSOCIATION WITH WAKEUP FILTER OF PATTERN "2" |
| 3 | DISCARD RAW 802-COMPLIANT PACKETS<br>DISCARD PACKETS OF SNAP TYPES A, B, AND C | PASS SNAP | | NO SETTING |
| 4 | TCP IS SET TO 139 (NETBIOS) AND 524 (NETWARE)<br>UDP IS SET TO 137 (NETBIOS) AND 138 (NETBIOS) | IP HIGHER-LEVEL PROTOCOL NO. IS SET TO 6 AND 17 (TCP, UDP) | | NO SETTING |
| 5 | IP HIGHER-LEVEL PROTOCOL NO. IS SET TO 8 OR 9 (EGP, IGP) | ETHER TYPE NO. IS SET TO 0X0800 (IP) | | NO SETTING |
| 6 | | IP HIGHER-LEVEL PROTOCOL NO. IS SET TO 6 AND 17 (TCP, UDP)<br>ETHER TYPE NO. IS SET TO 0X0800 (IP) | | NO SETTING |
| ... | ... | ... | | ... |

FIG.6

NETWORK CONTROL DEVICE AND CONTROL METHOD

BACKGROUND

1. Technical Field

The present invention relates to a network control device and control method, and in particular to a network control device and control method in which packet filtering is implemented so as to receive only packets to be received by the self device, by determining whether or not a received packet is allowed to pass through based on header information at a predetermined position of the received packet, and additionally determining whether or not the received packet is allowed to pass through based on header information of a higher level protocol of the received packet that is not referred to in the preceding determination.

2. Related Art

Along with the recent development of network technology and widespread use of computers, it has been tried to realize more effective use of resources for example by network-connecting computers and a printer to share the printer or by network-connecting computers to have the computers share data.

A computer and a printer are typically provided with a power saving mode for implementing power saving control to reduce power consumption. In a network-connected printer, for example, the power saving control is implemented by stopping power supply to a part of the printer consuming large power (e.g., fixing unit) when no print data is received for a preset period of time.

According to this conventional power saving control method, a packet received through the network is once taken in the printer to determine whether the packet contains print data or not. If the packet contains print data, the power saving control is cancelled to supply power to the printer part the power supply to which has been stopped, and the printer shifts to the normal mode.

SUMMARY

A first aspect of the present invention provides a network control device that has a packet filtering unit for implementing packet filtering based on prescribed information in a header of a received packet, which includes: a position designating unit that designates a prescribed comparison position in a higher level protocol header to the header of the received packet; and an additional determination unit that implements pattern matching filtering by comparing data at the comparison position designated by the position designating unit with preset data.

BRIEF DESCRIPTION OF THE DRAWINGS

An exemplary embodiment of the present invention will be described in detail based on the following figures, wherein:

FIG. 3 is a look-up table showing an example of reference positions and reference contents (byte patterns) of a packet referred to by a wakeup filter 111-4;

FIG. 6 is a reference chart 600 showing an example of settings of the unnecessary filer 111-3, the wakeup filter 111-4 and the additional pattern matching filter 111-5;

DETAILED DESCRIPTION

Referring to the accompanying drawings, a detailed description will be made of a preferred embodiment in which a network control device and control method according to the present invention are applied to a printer.

Figure 1:
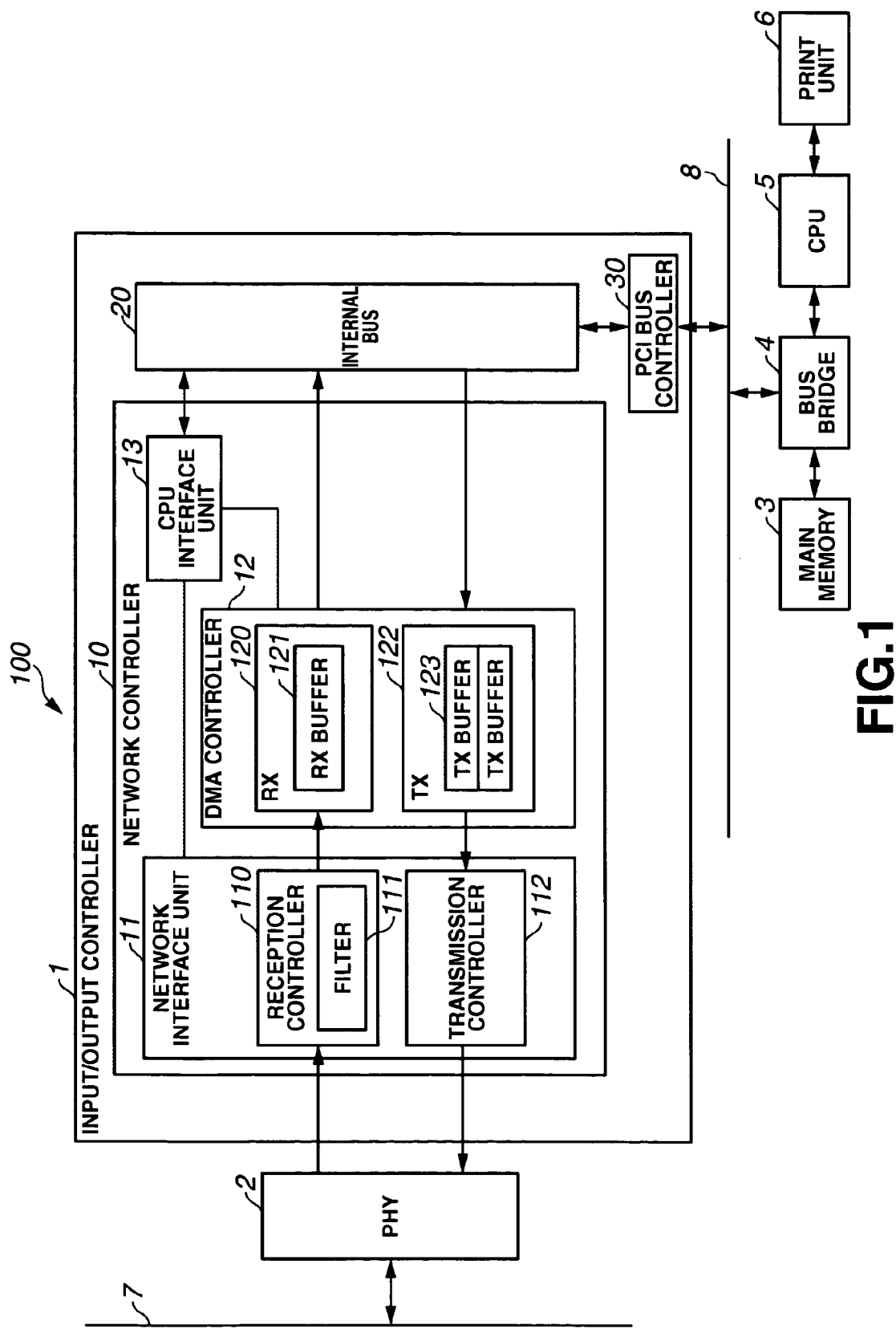
FIG. 1 is a block diagram illustrating configuration of a principal portion of a printer 100 to which a network control device and method according to the present invention are applied.

FIG. 1 is block diagram schematically showing a principal portion of a printer 100 to which a network control device and method of the present invention are applied.

In the printer 100 shown in FIG. 1, the network control device according to the present invention is applied in an input/output controller 1 of the printer 100. The printer 100 is thus designed such that, during the power saving mode of the printer 100, the printer 100 connected to a network 7 will not activate its CPU (central processing unit) by receiving a packet requiring no processing by the CPU to cancel the power saving mode of the printer 100.

This configuration enhances the power saving effect of the printer 100.

As shown in FIG. 1, the printer 100 includes a PHY (physical layer) 2 for performing data conversion on a packet received/transmitted through the network 7, an input/output controller 1 for performing control to transmit a packet onto the network 7 via the PHY 2 or to selectively take in, via the PHY 2, a packet transmitted through the network 7, a CPU 5 for integrally controlling the printer 100 as a whole, a main memory 3 for storing data and programs required by the CPU 5 to perform various processing tasks, a bus bridge 4 connected to the CPU 5 and the main memory 3, a PCI (Peripheral Components Interconnect) bus 8 for connecting the input/output controller 1, the bus bridge 4 and a print unit 6 to be described later, and the print unit 6 for printing received print data according to a command signal from the CPU 5.

The input/output controller 1 includes a network controller 10 to which the network control device according to the present invention is applied, and a PCI bus controller 30. The network controller 10 is connected to the PCI bus controller 30 via an internal bus 20.

The network controller 10 includes a network interface unit 11, a DMA (Direct Memory Access) controller 12, and a CPU interface unit 13. The network interface unit 11 includes a reception controller 110 having various filters 111 for performing packet filtering processing to determine whether the packet received via the network 7 and the PHY 2 is to be allowed to pass through or to be discarded, and a transmission controller 112 for transmitting a packet onto the network 7 via the PHY 2.

The DMA controller 12 performs control to transfer the data of the packet selectively taken in by a filter 111 of the network interface unit 11 to the main memory 3 without involving the CPU 5, or to transfer the data stored in the main memory 3 to the transmission controller 112 of the network interface unit 11 without involving the CPU 5.

The DMA controller 12 includes an RX buffer 120 and a TX buffer 121. The data of the packet selectively taken in by the data reception controller 110 is temporarily stored in the RX buffer 120 before transferred to the main memory 3. The data transferred from the main memory 3 is temporarily stored in the TX buffer 122 before transferred to the transmission controller 112 of the network interface unit 11.

The CPU interface unit 13 is connected to the network interface unit 11, the DMA controller 12, and the internal bus 20. The CPU interface unit 13 outputs an interrupt signal to the CPU 5 based on the packet filtering by the filters provided in the reception controller 110 of the network interface unit 11 or the DMA control by the DMA controller 12.

Set value information required by the input/output controller 1, such as a self MAC address and filter settings are written in a register group in the CPU interface unit 13 by the CPU 5 and held therein. In the printer 100 configured as described above, a packet received when the printer 100 is in the normal mode is transferred to the PHY 2 through the network 7, and transferred from the PHY 2 to the reception controller 110 of the network interface unit 11. The packet is further transferred from the reception controller 110 to the RX buffer 120 of the DMA controller 12 and to the PCI bus controller 30 through the internal bus 20, and transferred from the PCI bus 8 to the main memory 3 via the bus bridge 4.

A packet received when the printer 100 is in the power saving mode is transferred to the PHY 2 through the network 7, and transferred from the PHY 2 to the reception controller 110 of the network interface unit 11. The packet is then subjected to the packet filtering processing by the filters 111 provided in the reception controller 110, and only the packet having passed through the filters 111 is transferred from the reception controller 110 to the RX buffer 120 of the DMA controller 12 and to the PCI bus controller 30 through the internal bus 20, and transferred from the PCI bus 8 to the main memory 3 via the bus bridge 4.

The printer 100 which the network control device according to the present invention is applied to is designed, as described before, such that during the power saving mode the printer 100 is prevented from activating the CPU 5 and canceling the power saving mode by receiving a packet not requiring processing by the CPU 5 of the printer 100, and such that the deterioration of the power saving effect is thus prevented. In order to achieve this, the printer 100 is provided with a packet filtering function to pass only the packets which require the printer 100 to be shifted from the power saving mode to the normal mode, among all the packets transmitted through the network 7.

This packet filtering function is performed by the packet filtering processing implemented by the various filters 111 provided in the network interface unit 11.

Figure 2:
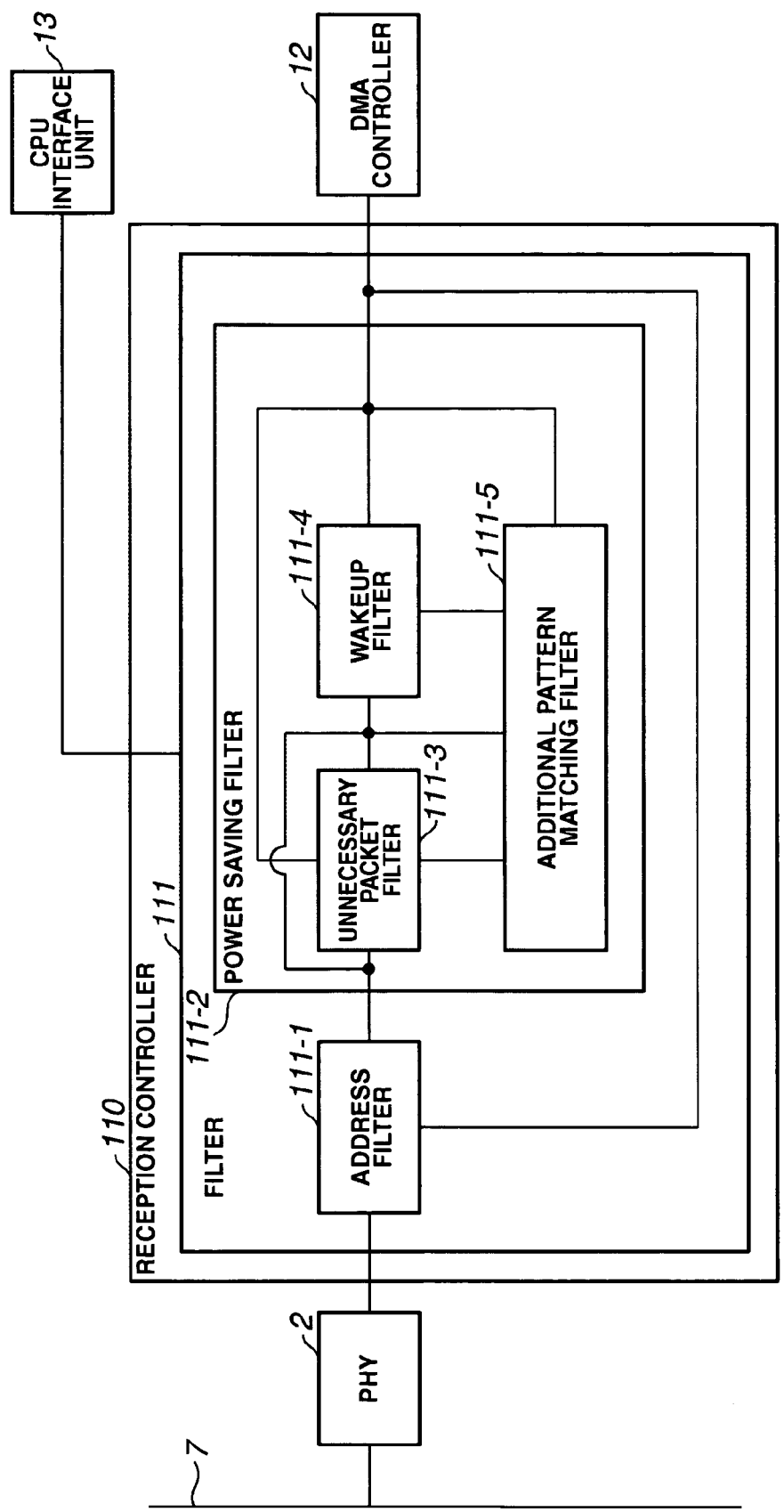
FIG. 2 is a conceptual diagram for explaining types of filters 111 provided in a reception controller 110 and packet filtering processing implemented by the filters.
Figure 7:
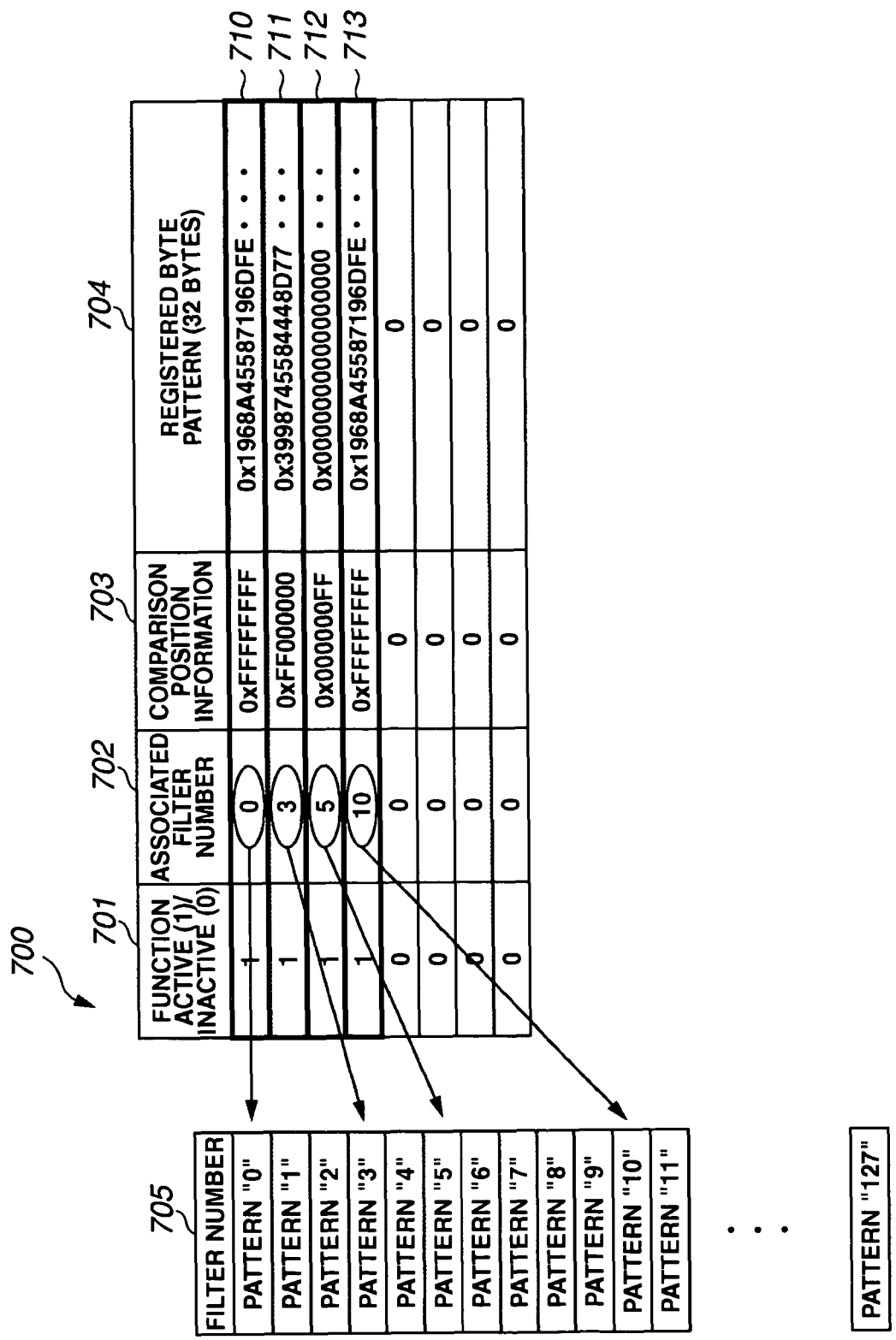
FIG. 7 is a diagram showing an example of set values of additional pattern setting information that are preset for operation in association with the unnecessary packet filter 111-3 or the wakeup filter 111-4.

FIG. 2 and FIG. 7 are conceptual diagrams for explaining types of the filters 111 provided in the reception controller 110 and the packet filtering processing implemented by these filters.

As shown in FIG. 2, the filters 111 provided in the reception controller 110 include an address filter 111-1 and a power saving filter 111-2. The power saving filter 111-2 includes an unnecessary packet filter 111-3, a wakeup filter 111-4, and an additional pattern matching filter 111-5.

The address filter 111-1 receives and passes only packets addressed to the self device (in this case, the unicast address and broadcast address, and receive-set multicast address to the printer 100). The address filter 111-1 determines for each of the packets received through the network 7 whether or not it has an address addressed to the self device (hereafter, referred to as the "self-addressed address"), and passes only the packets having the self-addressed address, whereas discarding the packet not having the self-addressed address.

The power saving filter 111-2 determines for each of the received packets whether it requires the printer 100 to be shifted from the power saving mode to the normal mode and determines whether or not the packet is to be allowed to pass through. The power saving filter 111-2 includes, as described above, the unnecessary packet filter 111-3, the wakeup filter 111-4, and the additional pattern matching filter 111-5.

The unnecessary packet filter 111-3 is a filter for determining whether a received packet is to be discarded or allowed to pass through. The unnecessary packet filter 111-3 compares the byte pattern at a predetermined fixed position of the received packet with a preset byte pattern at the fixed position to determine whether or not the byte patterns match. The unnecessary packet filter 111-3 discards the packet if the byte patterns match, whereas allows the packet to pass through if they don't match.

The unnecessary packet filter 111-3 may be, for example, an unnecessary ARP (Address Resolution Protocol) filter, an unnecessary IPX (Internetwork Packet eXchange) filter or the like. The predetermined fixed position of the packet compared by the unnecessary packet filter 111-3 and the byte pattern at the fixed position are defined by a byte pattern at a predetermined position of a packet that is preliminarily set fixedly according to the protocol of the packet transferred through the network 7.

Specifically, the byte pattern is for example a byte pattern of header information or the like that is fixedly set to a predetermined position of the packet according to an Ethertype, an IP higher-level number, or a TCP (Transmission Control Protocol) or UDP (User Datagram Protocol) port number.

The wakeup filter 111-4 performs packet filtering processing to allow only packets to pass through, that require to cancel the power saving mode of the printer 100 and to shift the printer from the power saving mode to the normal mode.

Specifically, a byte pattern at a predetermined fixed position of a packet required to be processed by the CPU 5 of the printer 100 is preliminarily registered, and a byte pattern at the predetermined fixed position of each received packet is compared with the pre-registered byte pattern so that only packets having a byte pattern matching with the pre-registered one is allowed to pass through.

FIG. 3 is a look-up table schematically illustrating an example of reference positions and comparison contents (byte patterns) of received packets, which the wakeup filter 111-4 refers to in association with the protocols of the received packets.

As shown in the look-up table 300 of FIG. 3, when the wakeup filter 111-4 is set so as to only allow packets addressed to a specific TCP or UDP port number to pass through (denoted by 310), TCP or UDP port numbers of packets to be allowed to pass through are preliminarily registered. A port number recorded in TCP or UDP header of a protocol (transport layer) 304 of a received packet is referred to, and the packet is allowed to pass through if the port number thus referred to matches the pre-registered port number.

When the wakeup filter 111-4 is set so as to only allow packets addressed to a specific IP protocol number (denoted by 311), an IP protocol number of packets to be allowed to pass through is preliminarily registered. An IP protocol number recorded in the IPV4/IPV6 header of a protocol (network layer) 303 of a received packet is compared with the pre-registered IP protocol number, and the packet is allowed to pass through if the IP protocol numbers match.

When the wakeup filter 111-4 is set so as to only allow packets addressed to a specific Ethertype such as ARP or IPX (denoted by 312), an Ethertype of packets to be allowed to pass through is preliminarily registered. An Ethertype recorded in the ETHER header of a protocol (link layer) 302 of a received packet is compared with the pre-registered Ethertype, and the packet is allowed to pass through if the Ethertypes match.

When the wakeup filter 111-4 is set so as to only allow packets addressed to a specific IEEE 802-compliant frame (denoted by 313), a byte pattern (of eight bytes following the Ethertype) of packets to be allowed to pass through is preliminarily registered. A byte pattern of eight bytes following the header of the protocol (link layer) 302 of a received packet is compared with the pre-registered byte pattern at that position, and the packet is allowed to pass through if the byte patterns match.

The additional pattern matching filter 111-5 is a filter for performing packet filtering processing by means of 32-byte pattern matching at an arbitrary position of a received packet, in addition to the packet filtering processing performed by the unnecessary packet filter 111-3 or the wakeup filter 111-4.

The unnecessary packet filter 111-3 and the wakeup filter 111-4 perform the packet filtering processing by comparing the byte pattern at the predetermined fixed position of a received packet with the pre-registered byte pattern corresponding to that position, whereas the additional pattern matching filter 111-5 performs packet filtering processing by comparing a byte pattern at an arbitrary position of a received packet, which is not referred to by the unnecessary packet filter 111-3 or the wakeup filter 111-4, with the pre-registered byte pattern corresponding to that position.

Specifically, the additional pattern matching filter 111-5 performs packet filtering processing by referring to a byte pattern in the header of a higher level protocol, in addition to the packet filtering processing implemented by the unnecessary packet filter 111-3 and the wakeup filter 111-4 referring to the byte pattern such as an Ethertype, IP higher-level number, or TCP/UDP port numbers recorded at a predetermined fixed position of a received packet.

FIGS. 4A to 4D illustrate an example of packet positions referred to by the additional pattern matching filter 111-5 according to the filter (the unnecessary packet filter 111-3 or the wakeup filter 111-4) to which the additional pattern matching filter 111-5 is associated with.

Figure 4A:
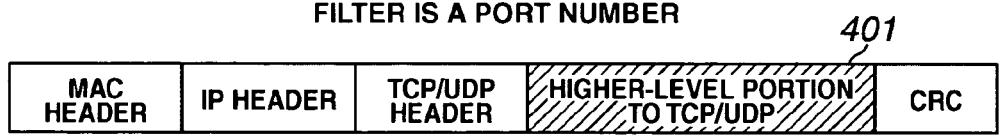
FIGS. 4A to 4D are diagrams each illustrating an example of a position of a packet referred to by an additional pattern matching filter 111-5.

FIG. 4A illustrates a case when the associated filter is a port number. As shown in FIG. 4A, when a received packet is discarded (by the unnecessary packet filter 111-3) or allowed to pass through (by the wakeup filter 111-4) as a result of the packet filtering processing implemented by the unnecessary packet filter 111-3 or the wakeup filter 111-4 based on information in the TCP or UDP header of the received packet, the additional pattern matching filter 111-5 compares the byte pattern following a position 401 in a higher-level header portion to the TCP or UDP header (higher-level portion to the TCP/UDP) of the received packet with the pre-registered byte pattern corresponding to that position, and, if they match, the additional pattern matching filter 111-5 discards the received packet (when the additional pattern matching filter 111-5 is associated with the unnecessary filer 111-3) or allows to pass through (when the additional pattern matching filter 111-5 is associated with the wakeup filter 111-4).

Figure 4B:

FIG. 4B illustrates a case when the associated filter is an IP higher-level protocol number. As shown in FIG. 4B, when a received packet is discarded (by the unnecessary packet filter 111-3) or allowed to pass through (by the wakeup filter 111-4) as a result of the packet filtering processing implemented by the unnecessary packet filter 111-3 or the wakeup filter 111-4 based on information in the IP header of the received packet, the additional pattern matching filter 111-5 compares the byte pattern following a position 402 in a higher-level header portion to the IP header (higher-level portion to the IP) of the received packet with the pre-registered byte pattern corresponding to that position, and, if they match, the additional pattern matching filter 111-5 discards the received packet (when the additional pattern matching filter 111-5 is associated with the unnecessary filer 111-3) or allows the received packet to pass through (when associated with the wakeup filter 111-4).

Figure 4C:

FIG. 4C illustrates a case when the associated filter is an Ethertype. As shown in FIG. 4C, when a received packet is discarded (by the unnecessary packet filter 111-3) or allowed to pass through (by the wakeup filter 111-4) as a result of the packet filtering processing implemented by the unnecessary packet filter 111-3 or the wakeup filter 111-4 based on information in the MAC header of the Ethertype of the received packet, the additional pattern matching filter 111-5 compares the byte pattern following a position 403 in a higher-level header portion to the MAC header (higher-level portion to the Ethernet (registered trademark)) of the received packet with the pre-registered byte pattern corresponding to that position, and, if they match, the additional pattern matching filter 111-5 discards the received packet (when the additional pattern matching filter 111-5 is associated with the unnecessary filer 111-3) or allows the received packet to pass through (when associated with the wakeup filter 111-4).

Figure 4D:

FIG. 4D illustrates a case when the associated filter is an IEEE 802-compliant frame. As shown in FIG. 4D, when a received packet is discarded (by the unnecessary packet filter 111-3) or allowed to pass through (by the wakeup filter 111-4) as a result of the packet filtering processing implemented by the unnecessary packet filter 111-3 or the wakeup filter 111-4 based on information of eight bytes following the MAC header of the received packet, the additional pattern matching filter 111-5 compares the byte pattern following a position 404 in a higher-level portion located eight bytes behind the MAC header (higher-level portion to the Ethernet) of the received packet with the pre-registered byte pattern corresponding to that position, and, if they match, the additional pattern matching filter 111-5 discards the received packet (when the additional pattern matching filter 111-5 is associated with the unnecessary filer 111-3) or allows the received packet to pass through (when associated with the wakeup filter 111-4).

Figure 5A:
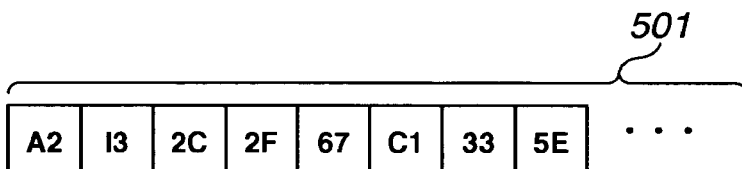
FIGS. 5A to 5C are explanatory diagrams illustrating a method of comparing byte patterns by the additional pattern matching filter 111-5.
Figure 5B:
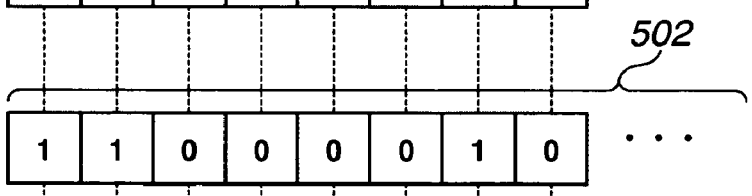

According the comparison method by the additional pattern matching filter 111-5 to compare a byte pattern at an arbitrary position of a received packet with a pre-registered byte pattern corresponding to that position, the byte pattern to be compared by additional pattern matching filter 111-5 is registered in a 32-byte storage area that is preliminarily prepared as shown in FIG. 5A. A flag of a value either "1" or "0" is set in a four-byte storage area for a comparison byte flag 502 prepared as shown in FIG. 5B. The 32-byte byte pattern is sequentially compared, at the positions corresponding to the value "1" of the comparison byte flag 502, with the byte pattern at the corresponding positions in the received packet up to a comparison end position as shown in FIG. 5C.

If the comparison results in that the 32-byte bit pattern 501 is totally match with the bit pattern of the received packet, the packet filtering processing is implemented to discard the packet (when associated with the unnecessary packet filter 111-3) or to allow the packet to pass through (when associated with the wakeup filter 111-4).

The arbitrary position and the byte pattern at that position of the packet referred to by the additional pattern matching filter 111-5 can be preset by the user as desired.

Figure 5C:
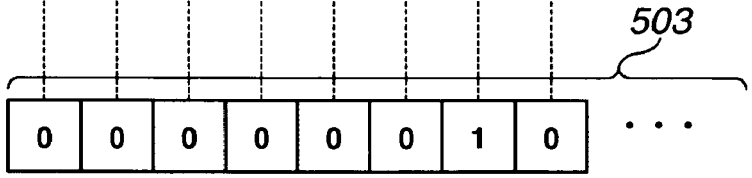

Specifically, as for the case shown in FIGS. 5A to 5C, the byte pattern of "A2I3**335E" in the bit pattern 501 of "A2I32C2F67C1335E" corresponds to the value "1" of the comparison byte flag 502. If this byte pattern of "A2I3**335E" matches with the byte pattern at that position of the received packet, the packet filtering processing is implemented to discard the packet (when associated with the unnecessary packet filter 111-3) or to allow the packet to pass through (when associated with the wakeup filter 111-4).

The symbol "*" in "A2I3****335E" denotes that any byte pattern is allowable, denotes the value "0" in the comparison byte flag 502, and the value "0" in the comparison end flag 503, respectively.

When the additional pattern matching filter 111-5 is associated with the unnecessary packet filter 111-3 to implement packet filtering processing, the packet filtering processing is implemented on a packet having passed through the address filter 111-1 so that the packet is discarded if the unnecessary packet filter 111-3 determines that the packet is to be discarded by referring to the byte pattern at a predetermined fixed position, and the additional pattern matching filter 111-5 determines that the byte pattern at a preliminarily arbitrarily designated position matches with a preset byte pattern, whereas otherwise the packet is allowed to pass through.

When the additional pattern matching filter 111-5 is associated with the wakeup filter 111-4 to implement packet filtering processing, the packet filtering processing is implemented on a packet having passed through the unnecessary packet filter 111-3 so that the packet is allowed to pass through if the wakeup filter 111-4 determines that the packet is to be allowed to pass through by referring to the byte pattern at a predetermined fixed position, and the additional pattern matching filter 111-5 determines that the byte pattern at a preliminarily arbitrarily designated position of the packet matches with the preset byte pattern, whereas otherwise the packet is discarded.

The additional pattern matching filter 111-5 may be associated with both the unnecessary packet filter 111-3 and the wakeup filter 111-4 to implement packet filtering processing. In this case, the packet filtering processing is implemented by associating the additional pattern matching filter 111-5 with the unnecessary packet filter 111-3, and in addition thereto the packet filtering processing is implemented by associating the additional pattern matching filter 111-5 with the wakeup filter 111-4.

Referring to FIG. 6, a description will be made of an example of settings and operation of the unnecessary filer 111-3, the wakeup filter 111-4, and the additional pattern matching filter 111-5 for implementing the packet filtering processing.

FIG. 6 is a reference chart 600 illustrating an example of settings of the unnecessary filer 111-3, the wakeup filter 111-4, and the additional pattern matching filter 111-5.

The reference chart 600 is composed of items of "pattern category" 601 associated with setting states of the unnecessary filer 111-3 and wakeup filter 111-4, "setting state of the unnecessary filer 111-3" 602, "setting state of the wakeup filter 111-4" 603, and "setting state of the additional pattern matching filter 111-5" 604. The pattern "0" in the pattern category 601 corresponds to a setting state in which the unnecessary filer 111-3 discards only a DHCP protocol (UDP 67) packet, and the wakeup filter 111-4 allows a packet having one of port numbers set by the wakeup filter 111-4 to pass through upon receiving such packet. The additional pattern matching filter 111-5, being associated with the unnecessary filer 111-3 in the setting state of the pattern "0", is set so as to discard only packets having the first byte of the header of the DHCP protocol (UDP 67) of "1", whereby other packets having the port numbers set in the wakeup filter 111-4 and having the first byte of the header of the UDP DHCP protocol (67) other than "0" are allowed to pass through.

The pattern "1" corresponds to a setting state in which the IP higher-level protocol number is set to 1 (ICMP) and 58 (ICMPv6) in the wakeup filter 111-4. This setting allows to pass through only the received packets that have an IP higher-level protocol of ICMP or ICMPv6.

The pattern "2" corresponds to a setting state in which the wakeup filter 111-4 is set to allow packets having an Ethertype number of 0x0806 (ARP) to pass through and the additional pattern matching filter 111-5 is set to allow only packets, among the packets having passed through the wakeup filter 111-4, that have an allocated IP address.

This setting allows the self device to receive only ARP packets to be received while discarding the other ARP packets.

The pattern "3" corresponds to a setting state in which the unnecessary filer 111-3 discards IEEE 802 compliant packets having a SNAP type of a, b, or c, and the wakeup filter 111-4 allows SNAP packets to pass through.

This setting makes it possible to discard Raw LLC packets among the received IEEE 802 compliant packets, while allowing the packets having a SNAP type other than a, b, and c.

The pattern "4" corresponds to a setting state in which the unnecessary filer 111-3 is set to discard packets of TCP port 139 (NetBIOS) and 524 (NetWare) and UDP port 137 (NetBIOS) and 138 (NetBIOS), and the wakeup filter 111-4 is set to allow the passage of packets of IP higher-level protocol numbers of 6 (TCP) and 17 (UDP). This setting makes it possible to allow the passage of received packets other than the TCP/IP or UDP/IP NetBIOS or NetWare protocol packets.

The pattern "5" corresponds to a setting state in which the unnecessary filer 111-3 is set to discard packets of IP higher-level protocol number of 8 (EGP) or 9 (IGP), and the wakeup filter 111-4 is set to allow the passage of packets of an Ethertype number of 0x0800 (IP). This setting makes it possible to allow the passage of all the received packets having IP higher-level protocols other than EGP and IGP.

The pattern "6" corresponds to a setting state in which the wakeup filter 111-4 is set to allow the passage of packets having an IP higher-level protocol number of 6 (TCP) or 17 (UDP), or those having an Ethertype number of 0x0800 (IP). This setting makes it possible to discard all the received IEEE 802 compliant packets, whereas allowing the passage of only TCP and UDP packets or IP packets.

FIG. 7 illustrates an example of additional pattern setting information 700 used to cause the additional pattern matching filter 111-5 to function in association with either the unnecessary packet filter 111-3 or the wakeup filter 111-4.

The additional pattern setting information 700 is composed of 32-byte registered byte patterns 704 which are preliminarily registered in the 32-byte pattern 501 (see FIGS. 5A to 5C) used by the additional pattern matching filter 111-5 for comparing the byte pattern at an arbitrary position of a received packet therewith, comparison position information 703 in which values of the comparison byte flag 502 (see FIGS. 5A to 5C) are preliminarily registered, pattern numbers 702 associated with the setting states of the unnecessary packet filter 111-3 or the wakeup filter 111-4 which the additional pattern matching filter 111-5 is associated with, function active/inactive information 701 for setting a value "1" to make the function of the additional pattern matching filter 111-5 active or a value "0" to make the function of the additional pattern matching filter 111-5 inactive, and filter numbers 705 indicating types of patterns 0 to 127 associated with the respective setting states of the unnecessary packet filter 111-3 or the wakeup filter 111-4.

The additional pattern setting information 700 is stored and held in a register group (not shown) of the CPU interface unit 13. The reception controller 110 implements the packet filtering processing on a received packet by combining various filters based on the setting information represented by the additional pattern setting information 700.

Specifically, as for additional pattern setting information 710, for example, in addition to the packet filtering processing corresponding to the settings of the unnecessary packet filter 111-3 or the wakeup filter 111-4 associated with the pattern "0" in the filter number 705, the additional pattern matching filter 111-5 implements packet filtering processing to determine whether or not to allow the passage of a received packet by comparing the byte pattern of the received packet at a position corresponding to the set values of the comparison byte flags set in the comparison position information 703 of the additional pattern setting information 710 with the 32-byte pattern set in the registered byte pattern 704 of the additional pattern setting information 710.

As for additional pattern setting information 711, in addition to the packet filtering processing corresponding to the settings of the unnecessary packet filter 111-3 or the wakeup filter 111-4 associated with the pattern "3" in the filter number 705, the additional pattern matching filter 111-5 implements packet filtering processing to determine whether or not to allow the passage of a received packet by comparing the byte pattern of the received packet at a position corresponding to the set values of the comparison byte flags set in the comparison position information 703 of the additional pattern setting information 711 with the 32-byte pattern set in the registered byte pattern 704 of the additional pattern setting information 711.

As for additional pattern setting information 712, in addition to the packet filtering processing corresponding to the settings of the unnecessary packet filter 111-3 or the wakeup filter 111-4 associated with the pattern "5" in the filter number 705, the additional pattern matching filter 111-5 implements packet filtering processing to determine whether or not to allow the passage of a received packet by comparing the byte pattern of the received packet at a position corresponding to the set values of the comparison byte flags set in the comparison position information 703 of the additional pattern setting information 712 with the 32-byte pattern set in the registered byte pattern 704 of the additional pattern setting information 712.

As for additional pattern setting information 713, in addition to the packet filtering processing corresponding to the settings of the unnecessary packet filter 111-3 or the wakeup filter 111-4 associated with the pattern "10" in the filter number 705, the additional pattern matching filter 111-5 implements packet filtering processing to determine whether or not to allow the passage of a received packet by comparing the byte pattern of the received packet at a position corresponding to the set values of the comparison byte flags set in the comparison position information 703 of the additional pattern setting information 713 with the 32-byte pattern set in the registered byte pattern 704 of the additional pattern setting information 713.

The reception controller 110 having the filters for implementing the packet filtering processing as described above implements the packet filtering processing on all the packets received via the network 7 and the PHY 2 of the printer 100. With reference to FIGS. 8 to 14, a description will be made of a representative example of the flow of a packet passing through the filters of the reception controller 110 and the operation of the printer 100.

The reception controller 110 implements the packet filtering processing on all the packets received via the network 7 and the PHY 2 of the printer 100 according to the following setting states that are set depending on whether the power saving filter function is activated or not.

The power saving filter function setting states include settings in which the power saving filter function is not activated (referred to as the "power saving filter OFF setting" for the sake of simplicity of description) and settings in which the power saving filter function is activated (referred to as the "power saving filter ON settings" for the sake of simplicity of description). The power saving filter ON settings include: (A) a setting in which only the unnecessary packet filter 111-3 is caused to function (referred to as the "unnecessary packet filter ON setting" for the sake of simplicity of description); (B) a setting in which both the unnecessary packet filter 111-3 and the wakeup filter 111-4 are caused to function (referred to as the "unnecessary packet filter ON/wakeup filter ON setting" for the sake of simplicity of description); (C) a setting in which both the unnecessary packet filter 111-3 and the additional pattern matching filter 111-5 are caused to function, and the additional pattern matching filter 111-5 is caused to function in association with the unnecessary packet filter 111-3 (referred to as the "unnecessary packet filter and additional pattern matching filter ON setting" for the sake of simplicity of description); (D) a setting in which the unnecessary packet filter 111-3, the wakeup filter 111-4, and the additional pattern matching filter 111-5 are caused to function, and the additional pattern matching filter 111-5 is caused to function in association with the wakeup filter 111-4 (referred to as the "unnecessary packet filter ON/wakeup filter and additional pattern matching filter ON setting" for the sake of simplicity of description); (E) a setting in which the unnecessary packet filter 111-3, the wakeup filter 111-4, and the additional pattern matching filter 111-5 are caused to function, and the additional pattern matching filter 111-5 is caused to function in association with both the unnecessary packet filter 111-3 and the wakeup filter 111-4 (referred to as the "unnecessary packet filter and additional pattern matching filter ON/wakeup filter and additional pattern matching filter ON setting" for the sake of simplicity of description); (F) a setting in which only the wakeup filter 111-4 is caused to function (referred to as the "wakeup filter ON setting" for the sake of simplicity of description); (G) a setting in which both the wakeup filter 111-4 and the additional pattern matching filter 111-5 are caused to function, and the additional pattern matching filter 111-5 is caused to function in association with the wakeup filter 111-4 (referred to as the "wakeup filter and additional pattern matching filter ON setting" for the sake of simplicity of description); (H) and a setting in which the unnecessary packet filter 111-3, the wakeup filter 111-4, and the additional pattern matching filter 111-5 are caused to function, and the additional pattern matching filter 111-5 is caused to function in association with the unnecessary packet filter 111-3 (referred to as the "unnecessary packet filter and additional pattern matching filter ON/wakeup filter ON setting" for the sake of simplicity of description).

Figure 8:
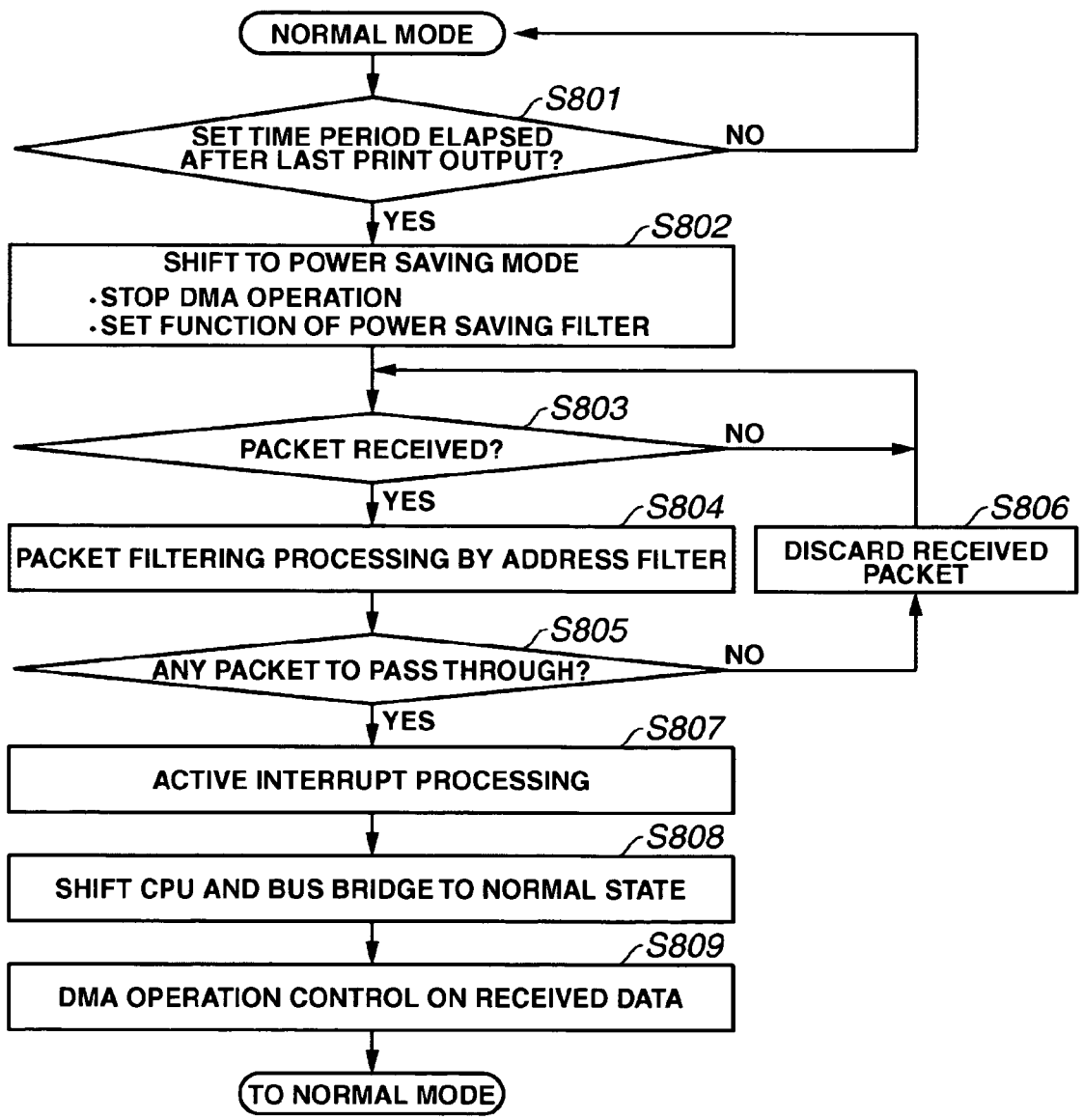
FIG. 8 is a flowchart illustrating an example of processing operation when the packet filtering function is set to the power saving filter OFF setting.

FIG. 8 is a flowchart illustrating an example of the processing operation when the packet filtering function of the printer 100 is set to the power saving filter OFF setting.

In this case, only the address filter 111-1 among the filters of the reception controller 110 is functioning. As shown in FIG. 8, when a predetermined set period of time has elapsed without print processing after the last printing by the printer 100 (YES in step S801), the DMA operation is automatically stopped and the printer 100 is shifted to the power saving mode (step S802).

When a packet is received via the network 7 and the PHY 2 of the printer 100 during the power saving mode of the printer 100 (YES in step S803), the received packet is transferred to the reception controller 110, and the address filter 111-1 of the reception controller 110 implements the packet filtering processing on the received packet (step S804).

Specifically, the address filter 111-1 refers to the MAC address recorded in the header of the received packet. If the MAC address is addressed to the self device, the packet is allowed to pass through (YES in step S805). If not (NO in step S805), the packet is discarded (step S806).

If the address filter 111-1 recognizes that the received packet is a packet addressed to the self device and allows the packet to pas through, the reception controller 110 sends a signal that the packet has passed through to the CPU interface unit 13 via the network interface unit 11. In response to the notification signal, the CPU interface unit 13 outputs an interrupt signal to the CPU 5 (step S807).

As the CPU 5 and the bus bridge 4 are shifted from the power saving mode to the normal mode in response to the interrupt signal from the CPU interface unit 13 (step S808), the packet which has passed through the address filter 111-1 of the reception controller 110 without being discarded is transferred to the DMA controller 12, and further transferred to the main memory 3 via the internal bus 20, the PCI bus controller 30, the PCI bus 8 and the bus bridge 4 (step S809).

The interrupt signal output by the CPU interface unit 13 is input to the CPU 5 via the internal bus 20, the PCI bus controller 30, the PCI bus 8 and the bus bridge 4.

The power saving mode of the printer 100 is cancelled by the CPU 5 being shifted to the normal mode and the printer 100 is shifted to the normal mode, so that the printer 100 implements predetermined print processing on the packet having passed through.

Figure 9:
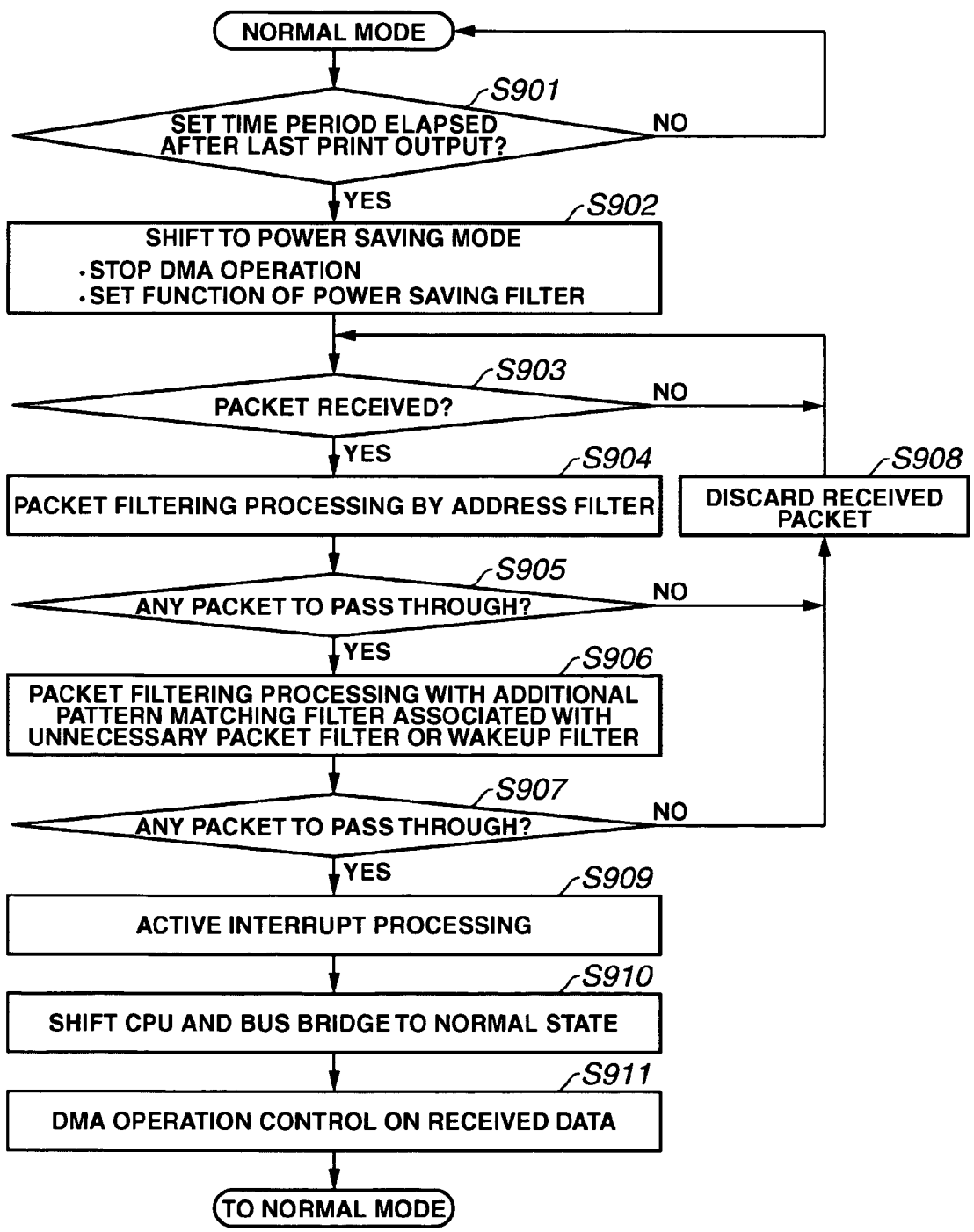
FIG. 9 is a flowchart illustrating an example of processing operation when the packet filtering function is set to the power saving filter ON setting.

FIG. 9 is a flowchart schematically illustrating an example of the processing operation when the packet filtering function of the printer 100 is set to the power saving filter ON setting.

As shown in FIG. 9, when a predetermined set period of time has elapsed without print processing after the last printing by the printer 100 (YES in step S901), the DMA operation is automatically stopped and the printer 100 is shifted to the power saving mode (step S902).

When a packet is received via the network 7 and the PHY 2 of the printer 100 during the power saving mode of the printer 100 (YES in step S903), the received packet is transferred to the reception controller 110, and the address filter 111-1 of the reception controller 110 implements the packet filtering processing on the received packet (step S904).

Specifically, in the same manner as the description of the flowchart of FIG. 8, the address filter 111-1 refers to the MAC address recorded in the header of the received packet. If the MAC address is addressed to the self device, the packet is allowed to pass through (YES in step S905). If not (NO in step S905), the packet is discarded (step S908).

The packet having passed through the address filter 111-1 is subjected to packet filtering processing according to the contents of the function setting set for the power saving filter 111-2 in step S902 (step S906).

As described above, the function setting states for the power saving filter 111-2 includes (A) the unnecessary packet filter ON setting, (B) the unnecessary packet filter ON/wakeup filter ON setting, (C) the unnecessary packet filter and additional pattern matching filter ON setting, (D) the unnecessary packet filter ON/wakeup filter and additional pattern matching filter ON setting, (E) the unnecessary packet filter and additional pattern matching filter ON/wakeup filter and additional pattern matching filter ON setting, (F) the wakeup filter ON setting, (G) the wakeup filter and additional pattern matching filter ON setting, and (H) unnecessary packet filter and additional pattern matching filter ON/wakeup filter ON setting. Particulars of the processing corresponding to these setting states will be described later in detail.

When the power saving filter 111-2 implements, on the packet having passed through the address filter 111-1, the packet filtering processing corresponding to the function setting state of the power saving filter 111-2 and determines to allow the packet to pass through (YES in step S907), the reception controller 110 sends a signal notifying that the packet is allowed to pass through to the CPU interface unit 13 via the network interface unit 11. In response to the notification signal, the CPU interface unit 13 outputs an interrupt signal to the CPU 5 (step S909).

If the power saving filter 111-2 determines, in step S907, not to allow the packet having passed through the address filter 111-1 to pass through (NO in step S907), packet filtering processing is implemented to discard the packet (step S908).

As the CPU 5 and the bus bridge 4 are shifted from the power saving mode to the normal mode in response to the interrupt signal from the CPU interface unit 13 (step S910), the packet which has passed through the address filter 111-1 of the reception controller 110 without being discarded is transferred to the DMA controller 12, and further transferred to the main memory 3 via the internal bus 20, the PCI bus controller 30, the PCI bus 8, and the bus bridge 4 (step S911).

The interrupt signal output by the CPU interface unit 13 is input to the CPU 5 via the internal bus 20, the PCI bus controller 30, the PCI bus 8, and the bus bridge 4.

The power saving mode of the printer 100 is cancelled by the CPU 5 being shifted to the normal mode and the printer 100 is shifted to the normal mode, so that the printer 100 implements predetermined print processing on the packet which has passed through.

Figure 10:
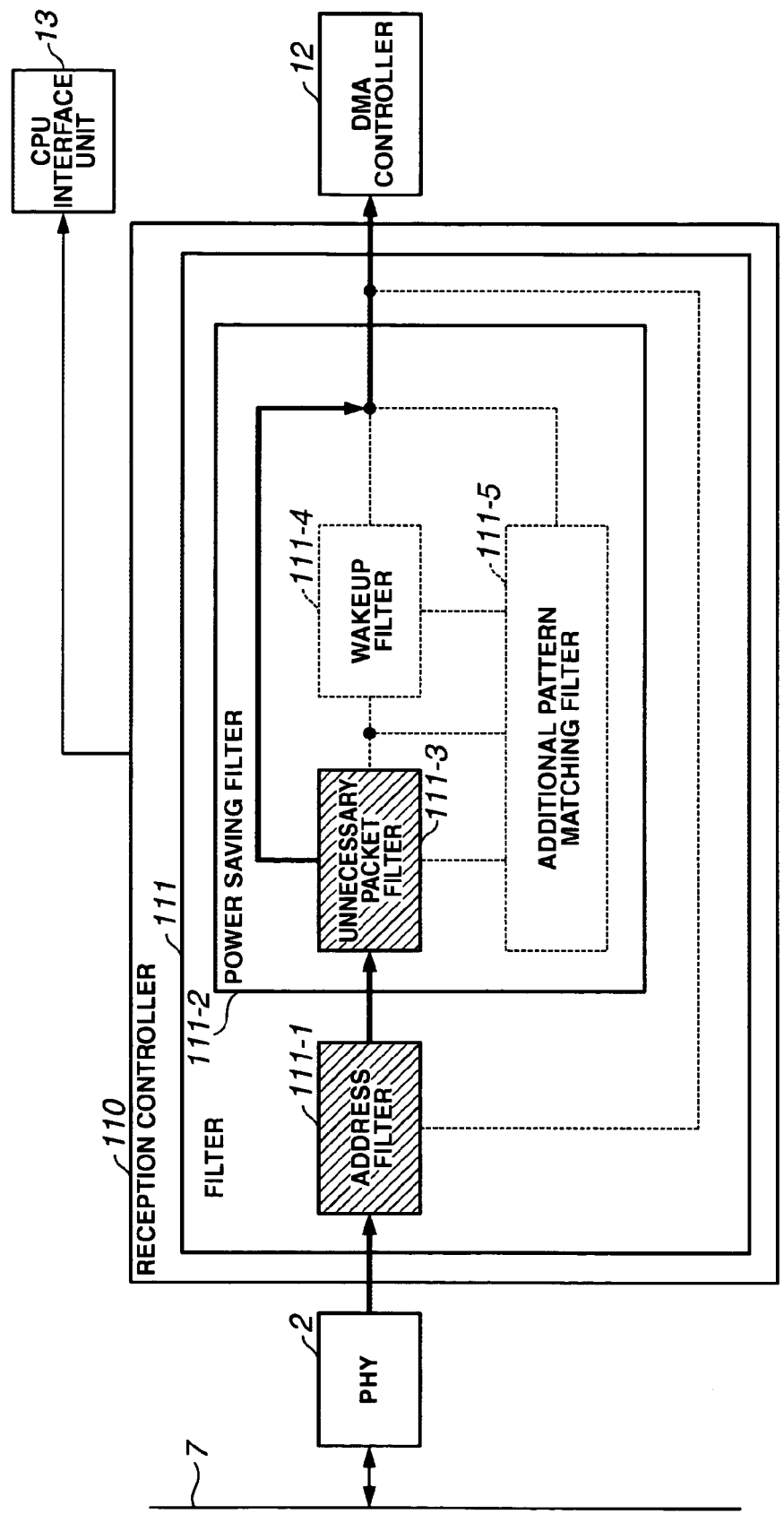
FIG. 10 is a conceptual diagram illustrating particulars of the processing operation when the function setting of the power saving filter 111-2 is (A) the unnecessary packet filter ON setting.

FIG. 10 is a conceptual diagram illustrating the particulars of the processing operation implemented when the function setting of the power saving filter 111-2 in step S907 is (A) the unnecessary packet filter ON setting.

In this case, the address filter 111-1 and the unnecessary packet filter 111-3 in the power saving filter 111-2 of the reception controller 110 are functioning. In FIG. 10, the address filter 111-1 and the unnecessary packet filter 111-3 are highlighted to indicate that these filters are functioning.

As shown in FIG. 10, the unnecessary packet filter 111-3 implements the packet filtering processing on the packet having passed through the address filter 111-1 to determine whether or not the byte pattern at a predetermined fixed position of the packet matches with the preset byte pattern. The unnecessary packet filter 111-3 discards the packet if the byte patterns match, whereas allows the packet to pass through if they don't match.

When the unnecessary packet filter 111-3 allows the packet to pass through, the reception controller 110 notifies so to the CPU interface unit 13 via the network interface unit 11. In response to the notification, the CPU interface unit 13 outputs an interrupt signal to the CPU 5, and thus the CPU 5 cancels the power saving mode of the printer 100 and shifts the printer 100 to the normal mode, so that predetermined processing is implemented on the packet having passed through.

Figure 11:
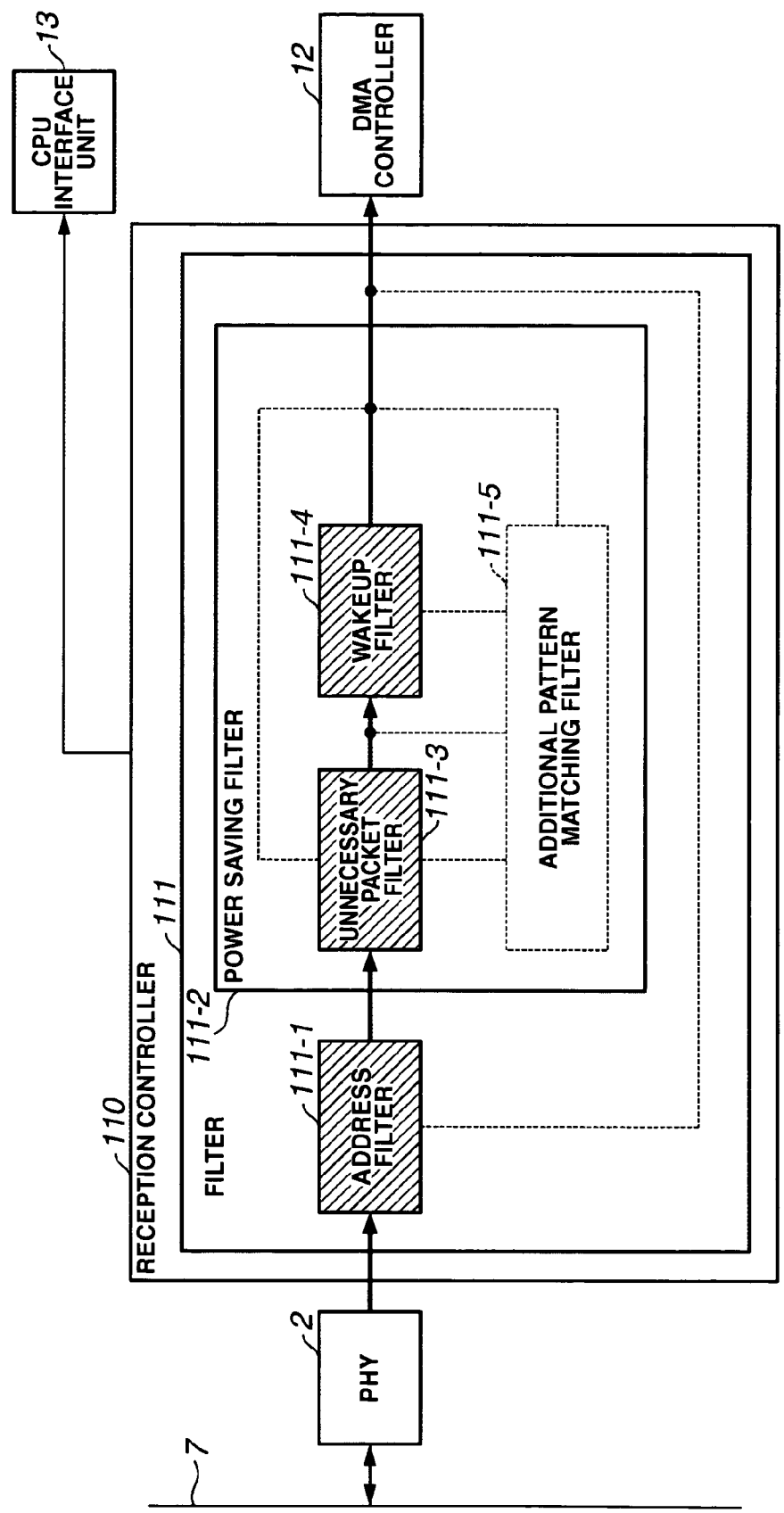
FIG. 11 is a conceptual diagram illustrating particulars of the processing operation when the function setting of the power saving filter 111-2 is (B) the unnecessary packet filter ON/wakeup filter ON setting.

FIG. 11 is a conceptual diagram illustrating particulars of the processing operation that is performed when the function setting of the power saving filter 111-2 in step S907 is (B) the unnecessary packet filter ON/wakeup filter ON setting.

In this case, the address filter 111-1, the unnecessary packet filter 111-3, and the wakeup filter 111-4 are functioning. In FIG. 11, these functioning filters are highlighted.

As shown in FIG. 11, the wakeup filter 111-4 implements the packet filtering processing on a packet having passed through the address filter 111-1 and the unnecessary packet filter 111-3 to determine whether or not to allow the packet to pass through.

Specifically, the wakeup filter 111-4 compares the byte pattern of the packet having passed through the unnecessary packet filter 111-3 with the byte pattern at a preliminarily set fixed position of the packet to determine whether or not the byte patterns match. If they match, the wakeup filter 111-4 allows the packet to pass through, whereas discards the packet if they don't match.

The packet having passed through the address filter 111-1 and the unnecessary packet filter 111-3 is a packet having an address addressed to the self device, and is a packet whose byte pattern at the preset predetermined fixed position does not match with the preset byte pattern.

When the wakeup filter 111-4 allows the packet to pass through, the reception controller 110 notifies so to the CPU interface unit 13 via the network interface unit 11. In response to the notification, the CPU interface unit 13 outputs an interrupt signal to the CPU 5. The CPU 5 thus cancels the power saving mode of the printer 100 and shifts the printer 100 to the normal mode, so that the packet having passed through is subjected to the predetermined processing.

Figure 12:
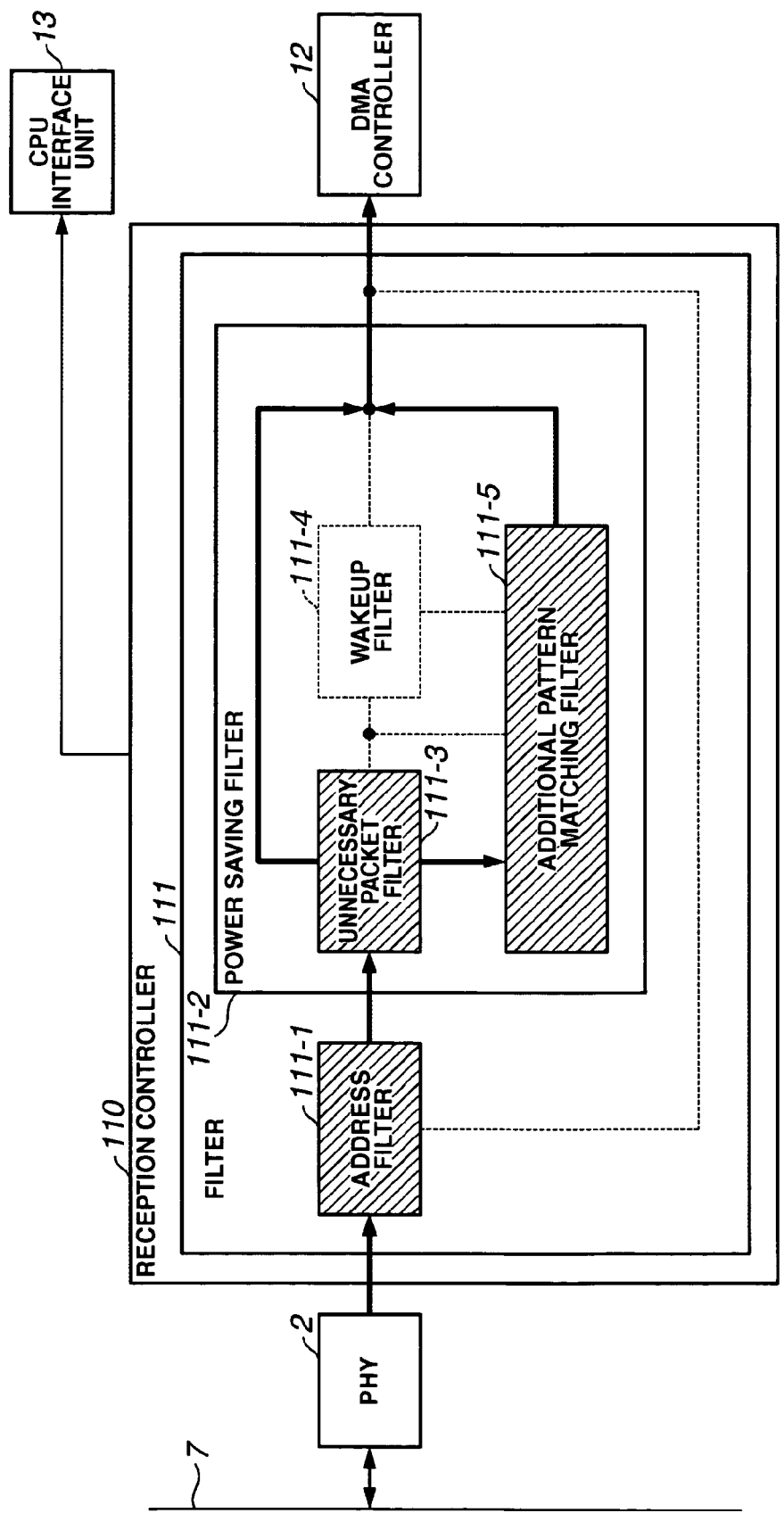
FIG. 12 is a conceptual diagram illustrating particulars of the processing operation when the function setting of the power saving filter 111-2 is (C) the unnecessary packet filter and additional pattern matching filter ON setting.

FIG. 12 is a conceptual diagram illustrating particulars of the processing operation that is implemented when the function setting of the power saving filter 111-2 in step S907 is (C) the unnecessary packet filter and additional pattern matching filter ON setting.

In this case, the address filter 111-1, the unnecessary packet filter 111-3, and the additional pattern matching filter 111-5 are functioning. In FIG. 12, these functioning filters are highlighted.

As shown in FIG. 12, the unnecessary packet filter 111-3 implements on a packet having passed through the address filter 111-1, the packet filtering processing as described above in relation to the setting state (A) (see FIG. 10). If the unnecessary packet filter 111-3 determines to allow the packet to pass through, the packet is transferred to the DMA controller 12, whereas if it determines that the packet is to be discarded, the packet is transferred to the additional pattern matching filter 111-5.

The additional pattern matching filter 111-5 implements the packet filtering processing by comparing the byte pattern at a preliminarily designated arbitrary position of the packet transferred from the unnecessary packet filter 111-3 with the preset byte pattern to determine whether or not the byte patterns match. If they don't match, the additional pattern matching filter 111-5 allows the packet to pass through, whereas discards the packet if they match.

When the unnecessary packet filter 111-3 or the additional pattern matching filter 111-5 allows the packet to pass through, the reception controller 110 notifies so to the CPU interface unit 13 via the network interface unit 11. In response to the notification, the CPU interface unit 13 outputs an interrupt signal to the CPU 5, and thus the CPU 5 cancels the power saving mode of the printer 100 to shift the printer to the normal mode, so that the predetermined processing is implemented on the packet having passed through.

Figure 13:
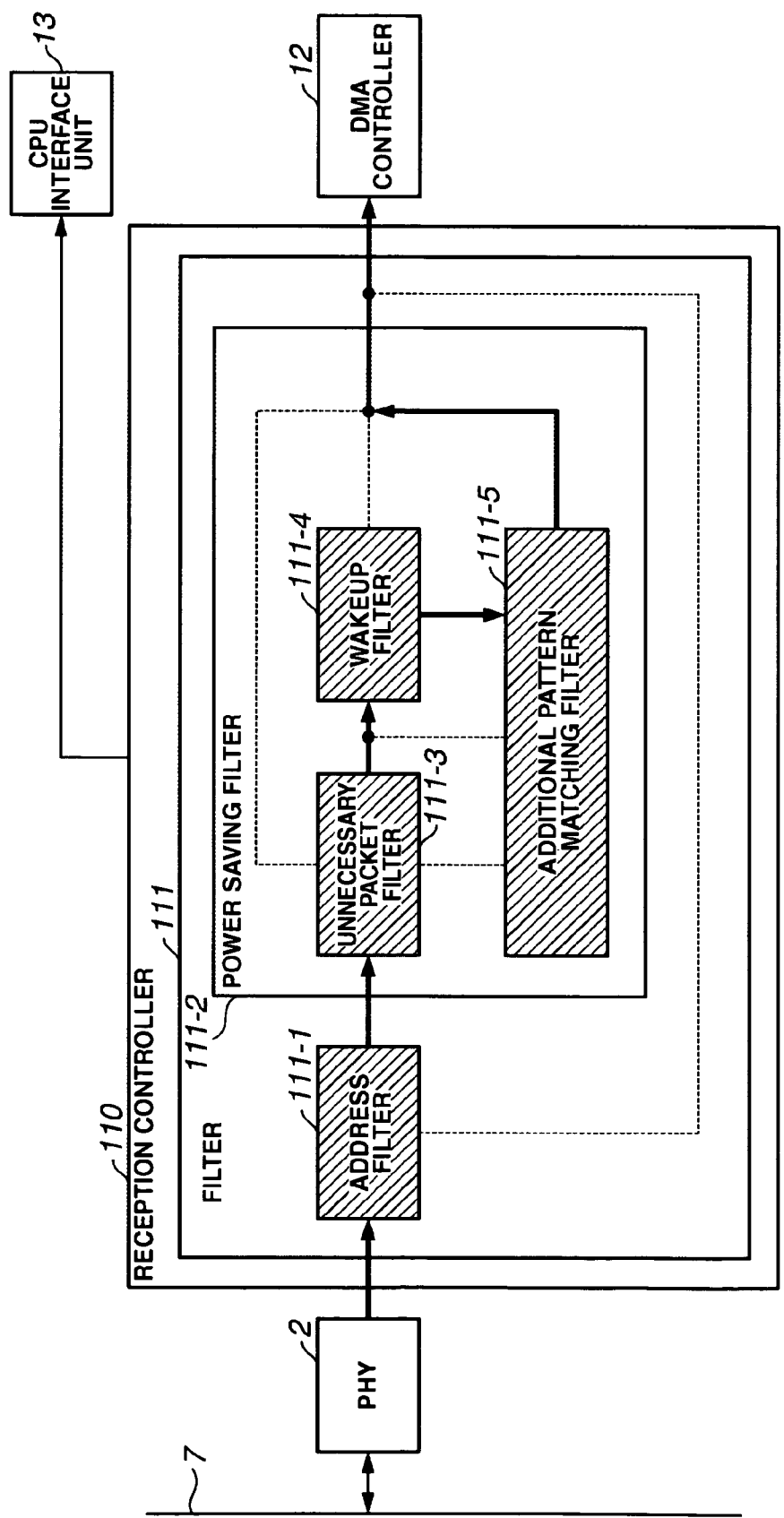
FIG. 13 is a conceptual diagram illustrating particulars of the processing operation when the function setting of the power saving filter 111-2 is (D) the unnecessary packet filter ON/wakeup filter and additional pattern matching filter ON setting.

FIG. 13 is a conceptual diagram illustrating particulars of the processing operation that is implemented when the function setting of the power saving filter 111-2 in step S907 is (D) the unnecessary packet filter ON/wakeup filter and additional pattern matching filter ON setting.

In this case, the address filter 111-1, the unnecessary packet filter 111-3, the wakeup filter 111-4, and the additional pattern matching filter 111-5 are functioning. In FIG. 13, these functioning filters are highlighted.

As shown FIG. 13, the wakeup filter 111-4 implements, on a packet having passed through the address filter 111-1 and the unnecessary packet filter 111-3, the packet filtering processing as described above in relation to the setting state (B) (see FIG. 11). If the wakeup filter 111-4 determines to allow the packet to pass through, the packet is transferred to the additional pattern matching filter 111-5.

The additional pattern matching filter 111-5 implements on the packet having passed through the wakeup filter 111-4 the packet filtering processing by comparing the byte pattern at a preliminarily designated position of the packet with the preset byte pattern to determine whether or not the byte patterns match. If they don't match, the additional pattern matching filter 111-5 discards the packet, whereas allows the packet to pass through if they match.

When the additional pattern matching filter 111-5 allows the packet to pass through, the reception controller 110 notifies so to the CPU interface unit 13 via the network interface unit 11. In response to the notification, the CPU interface unit 13 outputs an interrupt signal to the CPU 5, and thus the CPU 5 cancels the power saving mode of the printer 100 and shifts the printer to the normal mode, so that the predetermined processing is implemented on the packet having passed through.

Figure 14:
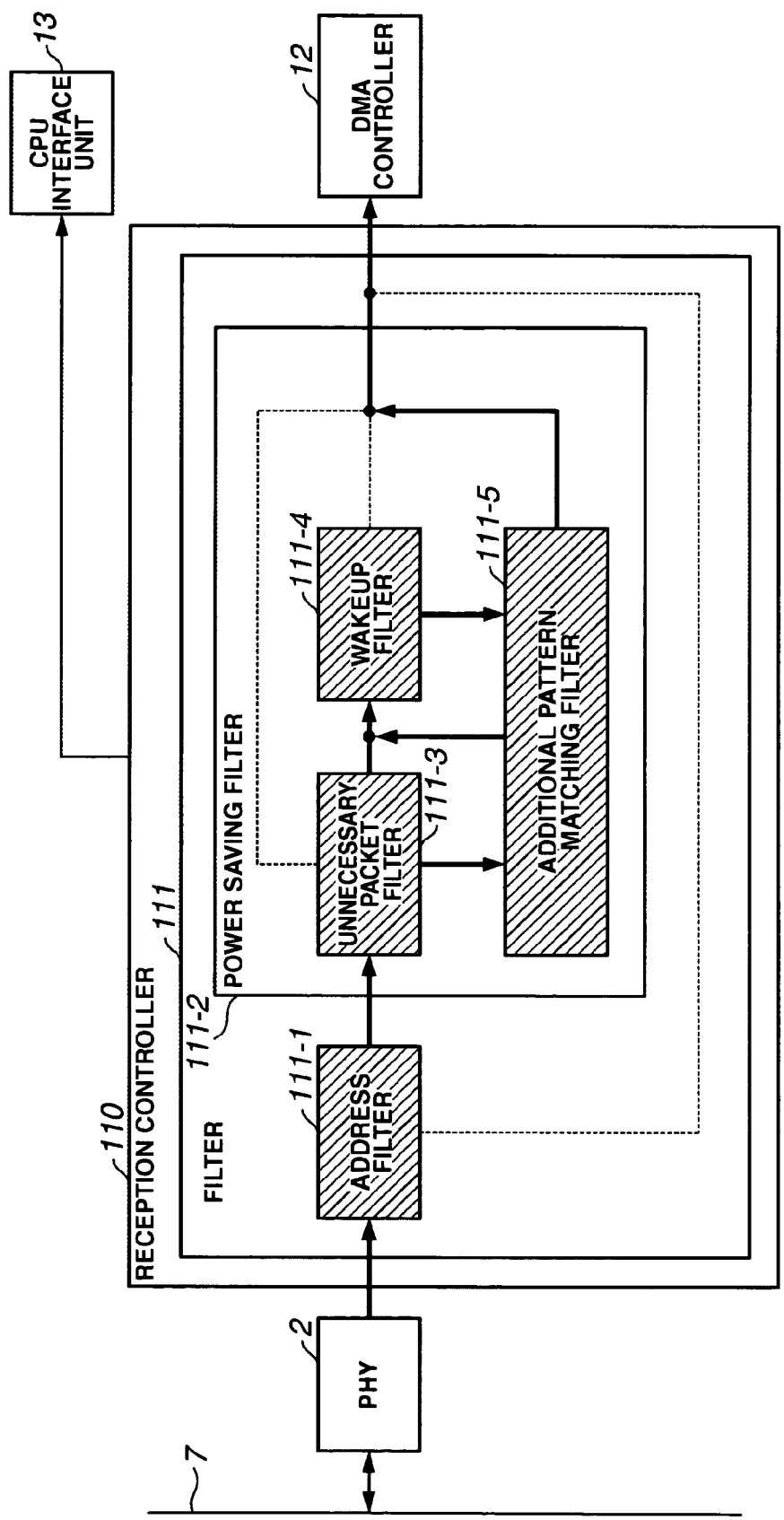
FIG. 14 is a conceptual diagram illustrating particulars of the processing operation when the function setting of the power saving filter 111-2 is (E) the unnecessary packet filter and additional pattern matching filter ON/wakeup filter and additional pattern matching filter ON setting.

FIG. 14 is a conceptual diagram illustrating particulars of the processing operation implemented when the function setting of the power saving filter 111-2 in step S907 is (E) the unnecessary packet filter and additional pattern matching filter ON/wakeup filter and additional pattern matching filter ON setting.

In this case, the address filter 111-1, the unnecessary packet filter 111-3, the wakeup filter 111-4, and the additional pattern matching filter 111-5 are functioning. In FIG. 14, these functioning filters are highlighted.

As shown in FIG. 14, the unnecessary packet filter 111-3 implements, on a packet having passed through the address filter 111-1, the packet filtering processing as described above in relation to the setting state (A) (see FIG. 10). If the unnecessary packet filter 111-3 determines that the packet is to be allowed to pass through, the packet is transferred to the wakeup filter 111-4, whereas if it determines that the packet is to be discarded, the packet is transferred to the additional pattern matching filter 111-5.

The additional pattern matching filter 111-5 compares the byte pattern at a preliminarily designated arbitrary position of the packet transferred from the unnecessary packet filter 111-3 with the preset byte pattern to determine whether or not the byte patterns match. If they don't match, the packet is transferred to the wakeup filter 111-4.

The wakeup filter 111-4 implements, on the packet having passed through the unnecessary packet filter 111-3 and the additional pattern matching filter 111-5, the packet filtering processing as described above in relation to the setting state (D) (see FIG. 13). If the wakeup filter 111-4 determines that the packet is to be allowed to pass through, the packet is further transferred to the additional pattern matching filter 111-5.

The additional pattern matching filter 111-5 implements, on the packet having passed through the wakeup filter 111-4, the packet filtering processing by comparing the byte pattern at a preliminarily designated arbitrary position of the packet with the preset byte pattern to determine whether or not the byte patterns match. If they don't match, the additional pattern matching filter 111-5 discards the packet, whereas allows the packet to pass through if they match.

When the additional pattern matching filter 111-5 allows the packet to pass through, the reception controller 110 notifies so to the CPU interface unit 13 via the network interface unit 11. In response to the notification, the CPU interface unit 13 outputs an interrupt signal to the CPU 5. Thus, the CPU 5 cancels the power saving mode of the printer 100 and shifts the printer 100 to the normal mode, so that the predetermined processing is implemented on the packet having passed through.

Figure 15:
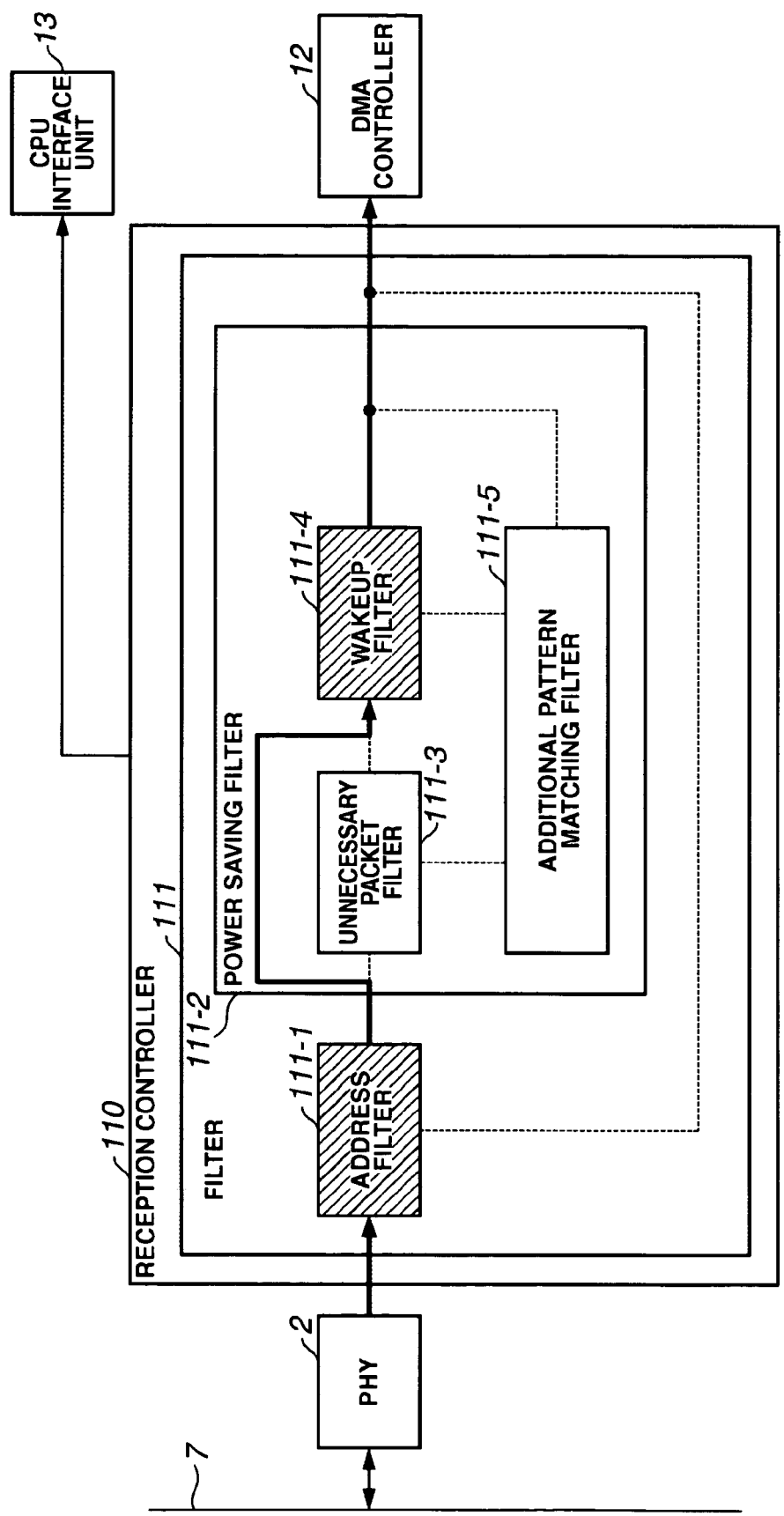
FIG. 15 is a conceptual diagram illustrating particulars of the processing operation when the function setting of the power saving filter 111-2 is (F) the wakeup filter ON setting.

FIG. 15 is a conceptual diagram illustrating particulars of the processing operation implemented when the function setting of the power saving filter 111-2 in step S907 is (F) the wakeup filter ON setting.

In this case, the address filter 111-1 and the wakeup filter 111-4 in the power saving filter 111-2 among the filters of the reception controller 110 are functioning. In FIG. 15, the address filter 111-1 and wakeup filter 111-4 are highlighted to indicate that these filters are functioning.

As shown in FIG. 15, the wakeup filter 111-4 compares the byte pattern at a preliminarily set fixed position of a packet having passed through the address filter 111-1 with the preset byte pattern to determine whether or not these byte patterns match. If they match, the wakeup filter 111-4 allows the packet to pass through, whereas discards the packet if they don't match.

The packet passing through the address filter 111-1 is a packet having an address addressed to the self device.

When the wakeup filter 111-4 allows the packet to pass through, the reception controller 110 notifies so to the CPU interface unit 13 via the network interface unit 11. In response to the notification, the CPU interface unit 13 outputs an interrupt signal to the CPU 5, and thus the CPU 5 cancels the power saving mode of the printer 100, shifting the printer 100 to the normal mode, so that the predetermined processing is implemented on the packet having pas through.

Figure 16:
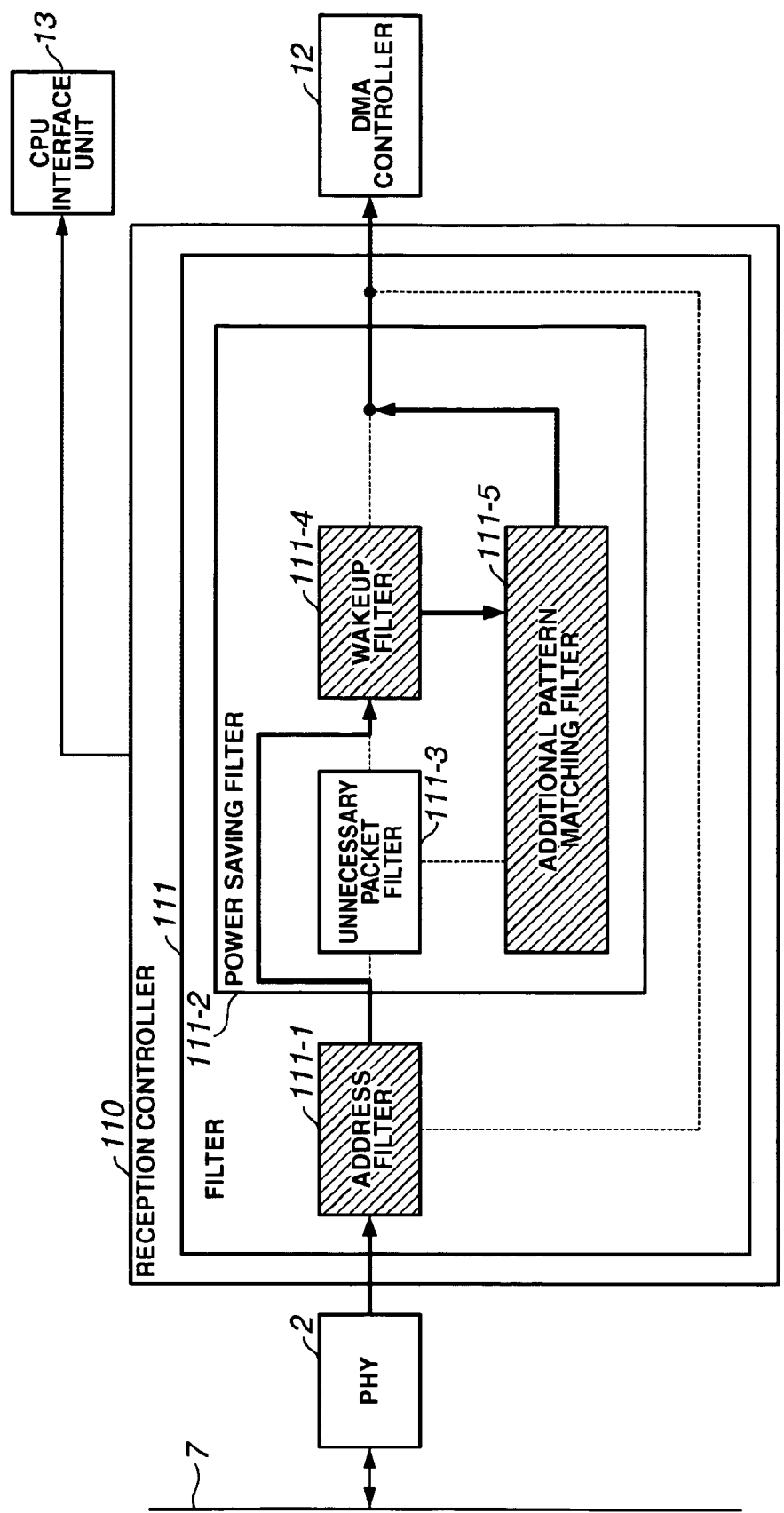
FIG. 16 is a conceptual diagram illustrating particulars of the processing operation when the function setting of the power saving filter 111-2 is (G) the wakeup filter and additional pattern matching filter ON setting.

FIG. 16 is a conceptual diagram illustrating particulars of the processing operation implemented when the function setting of the power saving filter 111-2 in step S907 is (G) the wakeup filter and additional pattern matching filter ON setting.

In this case, the address filter 111-1, the wakeup filter 111-4, and the additional pattern matching filter 111-5 are functioning. In FIG. 16, these functioning filters are highlighted.

As shown in FIG. 16, the wakeup filter 111-4 implements, on a packet having passed through the address filter 111-1, the packet filtering processing as described above in relation to the setting state (F) (see FIG. 15). If the wakeup filter 111-4 determines that the packet is to be allowed to pass through, the packet is transferred to the additional pattern matching filter 111-5.

The additional pattern matching filter 111-5 implements the packet filtering processing on the packet having passed through the wakeup filter 111-4, by comparing the byte pattern at a preliminarily designated arbitrary position of the packet with the preset byte pattern to determine whether or not the byte patterns match. If they don't match, the additional pattern matching filter 111-5 discards the packet, whereas allows the packet to pass through if they match.

When the additional pattern matching filter 111-5 allows the packet to pass through, the reception controller 110 notifies so to the CPU interface unit 13 via the network interface unit 11. In response to the notification, the CPU interface unit 13 outputs an interrupt signal to the CPU 5. Thus, the CPU 5 cancels the power saving mode of the printer 100 and shifts the printer 100 to the normal mode, so that the predetermined processing is implemented on the packet having passed through.

Figure 17:
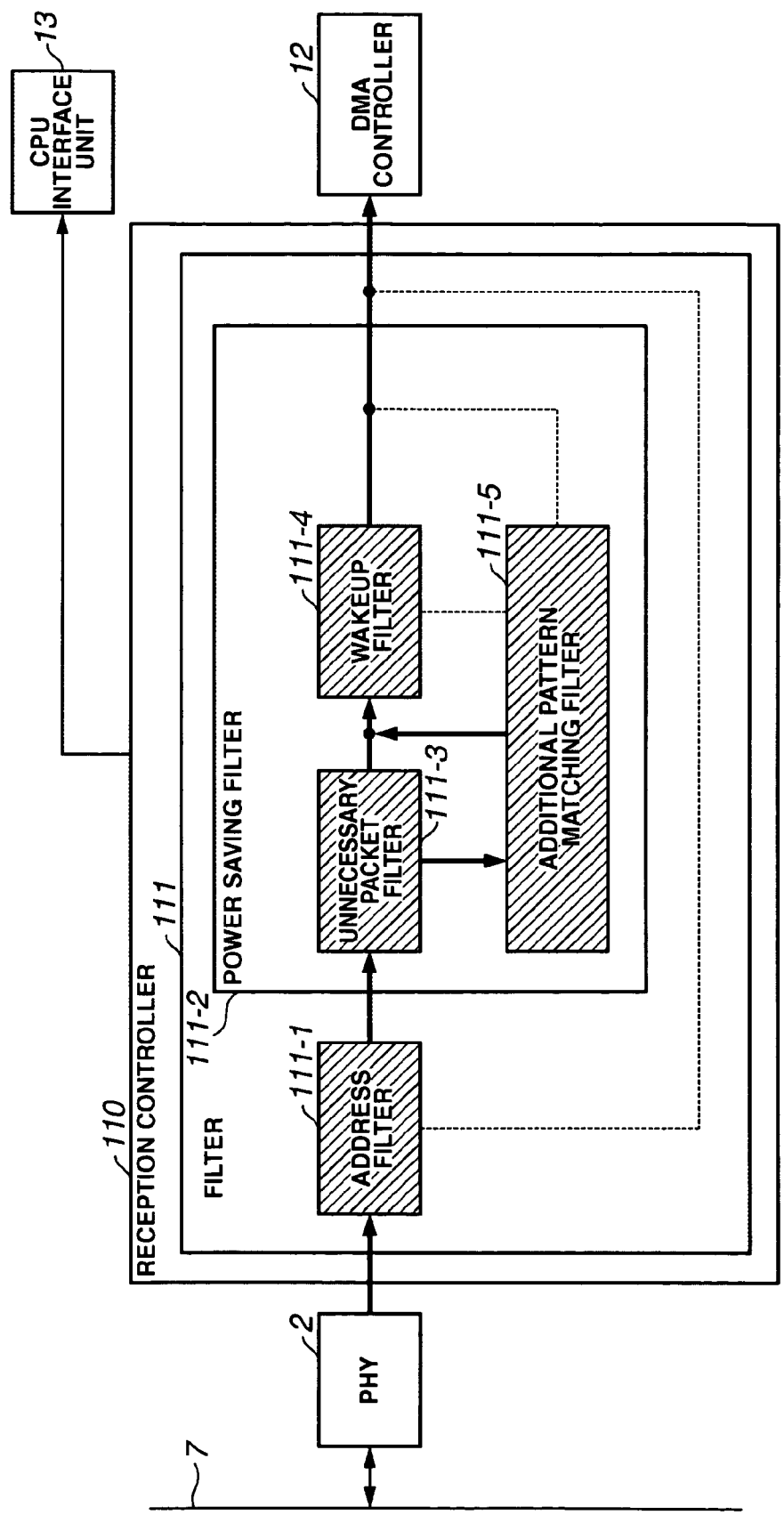
FIG. 17 is a conceptual diagram illustrating particulars of the processing operation when the function setting of the power saving filter 111-2 is (H) the unnecessary packet filter and additional pattern matching filter ON/wakeup filter ON setting.

FIG. 17 is a conceptual diagram illustrating particulars of the processing operation implemented when the function setting of the power saving filter 111-2 at step S907 is (H) the unnecessary packet filter and additional pattern matching filter ON/wakeup filter ON setting.

In this case, the address filter 111-1, the unnecessary packet filter 111-3, the wakeup filter 111-4, and the additional pattern matching filter 111-5 are functioning. In FIG. 17, these functioning filters are highlighted.

As shown in FIG. 17, the unnecessary packet filter 111-3 implements, on the packet having passed through the address filter 111-1, the packet filtering processing as described above in relation to the setting state (A) (see FIG. 10). If the unnecessary packet filter 111-3 determines that the packet is to be allowed to pass through, the packet is transferred to the wakeup filter 111-4, whereas the packet is transferred to the additional pattern matching filter 111-5 if the unnecessary packet filter 111-3 determines that the packet is to be discarded.

The additional pattern matching filter 111-5 determines whether or not the byte pattern at a preliminarily designated arbitrary position of the packet transferred from the unnecessary packet filter 111-3 with the preset byte pattern. If the byte patterns don't match, the packet is transferred to the wakeup filter 111-4.

The wakeup filter 111-4 implements, on the packet having passed through the unnecessary packet filter 111-3 and the additional pattern matching filter 111-5, the packet filtering processing as described above in relation to the setting state (D) (see FIG. 13). If the wakeup filter 111-4 determines to allow the packet to pass through, the packet is allowed to pass through. The reception controller 110 notifies so to the CPU interface unit 13 via the network interface unit 11. In response to the notification, the CPU interface unit 13 outputs an interrupt signal to the CPU 5. Thus, the CPU 5 cancels the power saving mode of the printer 100 and shifts the printer 100 to the normal mode, so that the predetermined processing is implemented on the packet having passed through.

As described above, the printer 100 to which the network control device and method according to the present invention is applied performs novel packet filtering processing by referring to the byte pattern at an arbitrary position of a received packet, in addition to the conventional packet filtering processing. Thus, the packet filtering processing can be performed in a more accurate manner so that the power saving mode is canceled and the printer 100 is shifted to the normal mode only when the printer 100 receives a packet requiring processing by the printer 100.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A network control device that has a plurality of filters for implementing packet filtering on the basis of prescribed information in a header of a received packet, comprising:

an unnecessary packet filter, a wakeup filter, an additional matching filter, and an output device, each of which is connected with each other;

a storage unit that is connected to the unnecessary packet filter, the wakeup filter, the additional matching filter and the output device, and stores preset information about the unnecessary packet filter, the wakeup filter and the additional matching filter; and a reception controller that is connected to the unnecessary packet filter, the wakeup filter, the additional matching filter, the output device and the storage unit, and controls whether or not to function the unnecessary packet filter, the wakeup filter and the additional matching filter, wherein, when the reception controller controls so as to function the unnecessary packet filter, the wakeup filter, and the additional matching filter, the unnecessary packet filter acquires the received packet, compares a byte pattern of a current protocol header in the header of the received packet with a first preset byte pattern stored in the storage unit, and outputs the received packet to the wakeup filter if both of the byte patterns do not match, the wakeup filter compares the byte pattern of the current protocol header in the header of the received packet output by the unnecessary packet filter with a third preset byte pattern stored in the storage unit, and outputs the received packet to the additional matching filter if both of the byte patterns match, and the additional matching filter compares the byte pattern of a higher level protocol header of the current protocol in the header of the received packet output by the wakeup filter with a fourth preset byte pattern stored in the storage unit; and outputs the received packet to the output device if both of the byte patterns match.

2. A network control device that has a plurality of filters for implementing packet filtering on the basis of prescribed information in a header of a received packet, comprising:

an unnecessary packet filter, a wakeup filter, an additional matching filter, and an output device, each of which is connected with each other;

a storage unit that is connected to the unnecessary packet filter, the wakeup filter, the additional matching filter and the output device, and stores preset information about the unnecessary packet filter, the wakeup filter and the additional matching filter; and a reception controller that is connected to the unnecessary packet filter, the wakeup filter, the additional matching filter, the output device and the storage unit, and controls whether or not to function the unnecessary packet filter, the wakeup filter and the additional matching filter, wherein, when the reception controller controls so as to function the unnecessary packet filter, the wakeup filter, and the additional matching filter, the unnecessary packet filter acquires the received packet, compares a byte pattern of a current protocol header in the header of the received packet with the first a first preset byte pattern stored in the storage unit, and outputs the received packet to the additional matching filter if both of the byte patterns match, the additional matching filter compares the byte pattern of a higher level protocol header of the current protocol in the header of the received packet output by the unnecessary packet filter with a second preset byte pattern stored in the storage unit, and outputs the received packet to the wakeup filter if both of the byte patterns do not match, and the wakeup filter compares the byte pattern of the current protocol header in the header of the received packet output by the additional matching filter with a third preset byte pattern stored in the storage unit, and outputs the received packet to the output device if both of the byte patterns match.

3. A network control device that has a plurality of filters for implementing packet filtering on the basis of prescribed information in a header of a received packet, comprising:

an unnecessary packet filter, a wakeup filter, an additional matching filter, and an output device, each of which is connected with each other, a storage unit that is connected to the unnecessary packet filter, the wakeup filter, the additional matching filter and the output device, and stores preset information about the unnecessary packet filter, the wakeup filter and the additional matching filter; and a reception controller that is connected to the unnecessary packet filter, the wakeup filter, the additional matching filter, the output device and the storage unit, and controls whether or not to function the unnecessary packet filter, the wakeup filter and the additional matching filter, wherein, when the reception controller controls so as to function the unnecessary packet filter, the wakeup filter, and the additional matching filter, the unnecessary packet filter acquires the received packet, compares a byte pattern of a current protocol header in the header of the received packet with a first preset byte pattern stored in the storage unit; and outputs the received packet to the additional matching filer if both of the byte patterns match, the additional matching filter compares the byte pattern of a higher level protocol header of the current protocol in the header of the received packet output by the unnecessary packet filter with a second preset byte pattern stored in the storage unit, and outputs the received packet to the wakeup filter if both of the byte patterns do not match, the wakeup filter compares the byte pattern of the current protocol header in the header of the received packet output by the additional matching filter with a third preset byte pattern stored in the storage unit, and outputs the received packet to the additional matching filter if both of the byte patterns match, and the additional matching filter further compares the byte pattern of the higher level protocol header of the current protocol in the header of the received packet output by the wakeup filter with a fourth preset byte pattern stored in the storage unit, and outputs the received packet to the output device if both of the byte patterns match.

4. A control method for a network control device that has a plurality of filters for implementing packet filtering on the basis of prescribed information in a header of a received packet, the method comprising:

a step of storing preset information about an unnecessary packet filter, a wakeup filter and an additional matching filter to a storage unit connected to the unnecessary packet filter, the wakeup filter, the additional matching filter and the output device;

a step of functioning the unnecessary packet filter, the wakeup filter, and the additional matching filter, by the reception controller connected to the unnecessary packet filter, the wakeup filter, the additional matching filter and the output device with each other;

a step of receiving, by the unnecessary packet filter, the received packet, comparing a byte pattern of a current protocol header in the header of the received packet with a first preset byte pattern stored in the storage unit, and outputting the received packet to the wakeup filter if both of the byte patterns do not match;

a step of comparing, by the wakeup filter, the byte pattern of the current protocol header in the header of the received packet output by the unnecessary packet filter with a third preset byte pattern stored in the storage unit, and outputting the received packet to the additional matching filter if both of the byte patterns match; and a step of comparing, by the additional matching filter, the byte pattern of a higher level protocol header of the current protocol in the header of the received packet output by the wakeup filter with a fourth preset byte pattern stored in the storage unit, and outputting the received packet to the output device if both of the byte patterns match.

5. A control method for a network control device that has a plurality of filters for implementing packet filtering on the basis of prescribed information in a header of a received packet, the method comprising:

a step of storing preset information about an unnecessary packet filter, a wakeup filter and an additional matching filter to a storage unit connected to the unnecessary packet filter, the wakeup filter, the additional matching filter and the output device;

a step of functioning the unnecessary packet filter, the wakeup filter, and the additional matching filter, by the reception controller connected to the unnecessary packet filter, the wakeup filter, the additional matching filter and the output device with each other;

a step of acquiring, by the unnecessary packet filter, the received packet, comparing a byte pattern of a current protocol header in the header of the received packet with a first preset byte pattern stored in the storage unit, and outputting the received packet to the additional matching filter if both of the byte patterns match;

a step of comparing, by the additional matching filter, the byte pattern of a higher level protocol header of the current protocol in the header of the received packet output by the unnecessary packet filter with a second preset byte pattern stored in the storage unit, and outputting the received packet to the wakeup filter if both of the byte patterns do not match; and a step of comparing, by the wakeup filter, the byte pattern of the current protocol header in the header of the received packet output by the additional matching filter with a third preset byte pattern stored in the storage unit, and outputting the received packet to the output device if both of the byte patterns match.

6. A control method for a network control device that has a plurality of filters for implementing packet filtering on the basis of prescribed information in a header of a received packet, the method further comprising:

a step of storing preset information about an unnecessary packet filter, a wakeup filter and an additional matching filter to a storage unit connected to the unnecessary packet filter, the wakeup filter, the additional matching filter and the output device;

a step of functioning the unnecessary packet filter, the wakeup filter, and the additional matching filter, by the reception controller connected to the unnecessary packet filter, the wakeup filter, the additional matching filter and the output device with each other;

a step of acquiring, by the unnecessary packet filter, the received packet, comparing a byte pattern of a current protocol header in the header of the received packet with a first preset byte pattern stored in the storage unit, and outputting the received packet to the additional matching filter if both of the byte patterns match;

a step of comparing, by the additional matching filter, the byte pattern of a higher level protocol header of the current protocol in the header of the received packet output by the unnecessary packet filter with a second preset byte pattern stored in the storage unit, and outputting the received packet to the wakeup filter if both of the byte patterns do not match;

a step of comparing, by the wakeup filter, the byte pattern of the current protocol header in the header of the received packet output by the additional matching filter with a third preset byte pattern stored in the storage unit, and outputting the received packet to the additional matching filter if both of the byte patterns match; and a step of comparing, by the additional matching filter, the byte pattern of the higher level protocol header of the current protocol in the header of the received packet output by the wakeup filter with a fourth preset byte pattern stored in the storage unit, and outputting the received packet to the output device if both of the byte patterns match.

\* \* \* \* \*